(12) United States Patent  (10) Patent No.: US 7,643,977 B2
Bertini  (45) Date of Patent: Jan. 5, 2010

(54) SYSTEM AND METHOD FOR PREDICTING PERFORMANCE OF ELECTRICAL POWER CABLES

(75) Inventor: Glen J. Bertini, Tacoma, WA (US)

(73) Assignee: Novinium, Inc., Kent, WA (US)

( * ) Notice: Subject to any disclaimer, the term of this patent is extended or adjusted under 35 U.S.C. 154(b) by 670 days.

(21) Appl. No.: 11/468,118

(22) Filed: Aug. 29, 2006

(65) Prior Publication Data

US 2007/0046668 A1 Mar. 1, 2007

Related U.S. Application Data

(60) Provisional application No. 60/712,309, filed on Aug. 30, 2005, provisional application No. 60/712,944, filed on Aug. 30, 2005.

(51) Int. Cl.
*G06F 17/50* (2006.01)
*B05D 5/12* (2006.01)
*H01B 9/06* (2006.01)
*H02G 3/04* (2006.01)
*H01B 3/10* (2006.01)

(52) U.S. Cl. .............. 703/13; 174/15.1; 174/68.1; 174/110 A; 174/15; 174/68; 174/110

(58) Field of Classification Search ............ 703/13; 427/45, 117; 29/858
See application file for complete search history.

(56) References Cited

U.S. PATENT DOCUMENTS

| | | | |
|---|---|---|---|
| 3,949,153 A * | 4/1976 | Pirooz et al. ............ | 174/15.6 |
| 4,299,713 A | 11/1981 | Maringer et al. | |
| 4,372,988 A * | 2/1983 | Bahder ................. | 427/541 |
| 4,543,381 A | 9/1985 | Barlow et al. | |
| 4,766,011 A | 8/1988 | Vincent et al. | |
| 4,870,121 A | 9/1989 | Bamji et al. | |
| 5,200,234 A * | 4/1993 | Bertini ................... | 427/118 |
| 5,372,840 A | 12/1994 | Kleyer et al. | |
| 5,372,841 A | 12/1994 | Kleyer et al. | |
| 6,005,055 A | 12/1999 | Dammert et al. | |
| 6,015,629 A | 1/2000 | Heyer et al. | |
| 6,162,491 A * | 12/2000 | Bertini ................... | 427/117 |
| 6,332,785 B1 * | 12/2001 | Muench et al. ......... | 439/88 |
| 6,596,945 B1 * | 7/2003 | Hughey et al. ......... | 174/125.1 |
| 6,604,571 B1 * | 8/2003 | Morrow et al. ........ | 165/104.21 |
| 6,697,712 B1 | 2/2004 | Bertini et al. | |

(Continued)

OTHER PUBLICATIONS

Bertini, Glen. "Accelerated Aging of Rejuvenated Cables—Part II", Nov. 2005.*

(Continued)

*Primary Examiner*—Kamini S Shah
*Assistant Examiner*—Shambhavi Patel
(74) *Attorney, Agent, or Firm*—Davis Wright Tremaine LLP; George C. Rondeau, Jr.

(57) ABSTRACT

A computer simulation method is disclosed for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time. The simulation method comprises for a selected length of the simulated cable, defining a plurality of radially arranged finite volumes extending the selected length of the simulated cable, and estimating the radial temperature of each finite volume. For a selected time period after the initial time, performing a series of steps at least once and outputting or otherwise using the value of the new concentration for the dielectric enhancement fluid component within each finite volume.

21 Claims, 14 Drawing Sheets

U.S. PATENT DOCUMENTS

| | | |
|---|---|---|
| 7,195,504 B2 | 3/2007 | Bertini et al. |
| 7,353,601 B1 | 4/2008 | Bertini |
| 2005/0189130 A1 | 9/2005 | Bertini et al. |
| 2005/0191910 A1 | 9/2005 | Bertini et al. |
| 2005/0192708 A1 | 9/2005 | Bertini |
| 2007/0169954 A1 | 7/2007 | Bertini et al. |

OTHER PUBLICATIONS

Liu et al. "Study of Heat and Moisture Transfer in Soil with a Dry Surface Layer" International Journal of Heat and Mass Transfer 48 (2005) 4579-4589.*

Weerts, et al. "Tortuosity of an Unsaturated Sandy Soil Estimated using Gas Diffusion and Bulk Soil Electrical Conductivity: Comparing Analogy-based Models and Lattice-Boltzmann Simulations", Soil Science Society of America Journal, vol. 65, No. 6, Nov.-Dec. 2001.*

U.S. Appl. No. 11/379,979, filed Apr. 24, 2006, Bertini.

U.S. Appl. No. 11/468,274, filed Aug. 29, 2006, Bertini et al.

U.S. Appl. No. 11/625,251, filed Jan. 19, 2007, Bertini et al.

Premedia Business Magazines & Media Inc.; Submarine Cable Rescued With Silicone-Based Fluid; Transmission & Distribution World; Jul. 1, 1999; 4 pgs.; USA.

Kim Jenkins, UTILX Corp.; Submarine Cable Rescued With Silicone-Based Fluid; Slide Presentation; 18 pgs; USA.

Glen J. Bertini, Entergy Metro Case Study; Post-Treatment Lessons; ICC Meeting; Apr. 1997; Scottsdale, Arizona; USA.

Glen J. Bertini, UTILX Corp.; Recent Advancements in Cable Rejuvenation Technology; IEEE/PES 1999 Summer Meeting; Reliability Centered Maintenance, Jul. 21, 1999; 5 pgs.

A.L. McKean; Breakdown Mechanism Studies in Crosslinked Polyethylene Cable; IEEE Transactions on Power Apparatus and Systems, vol. PAS-95, No. 1; Jan./Feb. 1976; Yonkers, NY; USA.

R. Hudson & M. Crucitt; Salt River Project; SRP Enhance Reliability of Underground Distribution Cable; 4 pgs.; http//www.tdworld.com/mag/power_srp_enhances_reliability/.

Kleyer & Chatterton; IEEE Power Engineering Society Conference; "The Importance of Diffusion and Water Scavenging in Dielectric Enhancement of Aged Medium Voltage Underground Cables"; Technical Paper Summaries; 7 pages; Apr. 10-15, 1994.

"New Developments in Solid Dielectric LIfe Extension Technology" Glen J. Bertini, IEEE International Symposium on Electrical Insulation (Sep. 2004).

Bertini, "Accelerated Aging of Rejuvenated Cables—Part I", ICC, Sub. A, Apr. 19, 2005.

Bertini, "Accelerated Aging of Rejuvenated Cables—Part II", ICC, Sub. A, Nov. 1, 2005.

Injection Supersaturation "Minutes of the 104" Meeting of the IEEE, PES, ICC; Oct. 26, 1998; Appendix A (5-30)-1.

Bertini and Chatterton, "Dielectric Enhancement Technology" Mar./Apr. 1994 IEEE Electrical Insulation Magazine.

Cost Savings Model for Power Cables—methodology for testing/treating/replacing cable segments [may be on Utilx web site at: http://www.wiredynamix.com/npv/npv.aspx].

Bertini "Further Improvements in Rejuvenation Technology" Presented at Apr. 18, 2005 ICC Conference, Discussion Group C26D.

Steenis and Kreuger "Water Treeing in Polyethylene Cables" IEEE Transactions on Electrical Insulation, vol. 25, No. 5, Oct. 1990.

* cited by examiner

FINITE VOLUME MASS FLUX (CALCULATION OVERVIEW)

SYSTEM AND METHOD FOR PREDICTING PERFORMANCE OF ELECTRICAL POWER CABLES

CROSS REFERENCE TO RELATED APPLICATION(S)

This application claims priority benefit of provisional applications Ser. No. 60/712,309 filed Aug. 30, 2005 and Ser. No. 60/712,944 filed Aug. 30, 2005.

FIELD OF THE INVENTION

The present invention relates to a method for extending the longevity of an electrical power cable. More particularly, the invention relates to a computer simulation method for predicting the long-term dielectric performance of an in-service electrical cable segment which has been restored by injecting a dielectric enhancing fluid into the interstitial void volume of the cable.

BACKGROUND OF THE INVENTION

The gradual deterioration, and eventual failure, of electrical cables, such as those used in underground residential distribution circuits (URD), is well known. Failure of such cables, which generally comprise a stranded conductor surrounded by a semi-conducting conductor shield, a polymeric insulation jacket, and an insulation shield, is primarily attributed to high electrical fields within the insulation jacket as well as long term exposure thereof to environmental moisture. Since replacing an underground cable is costly, a cable which has either actually failed, or is likely to do so in the near term based on statistical data, is often treated (rejuvenated) to restore the dielectric integrity of its insulation, thereby extending its useful life in a cost-effective manner. A typical method for treating such an in-service cable comprises introducing a tree retardant fluid into the void space (interstitial void volume) associated with the strand conductor geometry. This fluid is generally selected from a particular class of aromatic alkoxysilanes which can polymerize within the cable's interstitial void volume as well as within the insulation by reacting with adventitious water (see, for example, U.S. Pat. Nos. 4,766,011, 5,372,840 and 5,372,841). Such a method (herein referred to as a "low-pressure" restorative method) typically leaves a fluid reservoir pressurized at no more than about 30 psig (pounds per square inch gage) connected to the cable for a 60 to 90 day "soak period" to allow the fluid to penetrate (i.e., diffuse into) the cable insulation and thereby restore the dielectric properties.

Those skilled in the art of cable restoration currently have limited ability to predict the efficacy of one of the above low-pressure restorative methods in their quest for improved fluid compositions and optimized parameters. Moreover, this assessment of efficacy is time-consuming and generally limited to results on a particular cable/fluid combination operating under relatively specific conditions. For example, a current procedure utilized in the art to determine the performance of a fluid (or fluid mixture) requires that each candidate fluid is injected into a laboratory cable which is then subjected to an expensive and multi-month accelerated aging regimen at a single temperature, whereupon it is sacrificed in an AC breakdown (ACBD) or impulse breakdown test and also subjected to analysis of the concentration profile of the fluid's components. Unfortunately, this accelerated aging method does not address the impact of real world dynamic cable temperature variation and it has been shown to result in errors in the range of an order of magnitude when used to predict actual cable ACBD field performance. (See Bertini, "Accelerated Aging of Rejuvenated Cables—Part I", IEEE/PES/ICC Apr. 19, 2005 and Bertini, "Accelerated Aging of Rejuvenated Cables—Part II", IEEE/PES/ICC Nov. 1, 2006.)

SUMMARY OF THE INVENTION

A computer simulation method is disclosed for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time. The simulation method comprises:

for a selected length of the simulated cable, defining a plurality of radially arranged finite volumes extending the selected length of the simulated cable;

estimating the radial temperature of each finite volume;

for a selected time period after the initial time, performing at least once each of:

calculating the change in mass of the dielectric enhancement fluid component within each finite volume due to chemical reactions;

calculating the diffusion properties of the dielectric enhancement fluid component within each finite volume;

calculating the mass flux from one finite volume to another finite volume for the dielectric enhancement fluid component within the finite volumes; and combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume; and outputting the value of the new concentration for the dielectric enhancement fluid component within each finite volume.

The computer simulation method can further include:

using the outputted value of the new concentration for the dielectric enhancement fluid component within each finite volume to determine a first calculated concentration profile for the dielectric enhancement fluid component within the conductor shield and the insulation jacket of the simulated cable for the selected time period after the initial time;

determining a constant radial temperature for each finite volume that results in a second calculated concentration profile for the dielectric enhancement fluid component within the conductor shield and the insulation jacket of the simulated cable for the selected time period after the initial time that approximates the first calculated concentration profile, by:

selecting a constant radial temperature for each finite volume to use in determining the second calculated concentration profile;

using the selected constant radial temperature, for a selected time period after the initial time, performing at least once each of:

calculating the change in mass of the dielectric enhancement fluid component within each finite volume due to chemical reactions;

calculating the diffusion properties of the dielectric enhancement fluid component within each finite volume;

calculating the mass flux from one finite volume to another finite volume for the dielectric enhancement fluid component within the finite volumes;

combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume;

outputting the value of the new concentration for the dielectric enhancement fluid component within each finite volume using the selected constant radial temperature;

using the outputted value of the new concentration for the dielectric enhancement fluid component within each finite volume using the selected constant radial temperature to determine the second calculated concentration profile;

determining if the second calculated concentration profile approximates the first calculated concentration profile;

if the selected constant radial temperature does not result in the second calculated concentration profile being determined to approximate the first calculated concentration profile, selecting a new constant radial temperature to use in determining the second calculated concentration profile; and if the selected constant radial temperature does result in the second calculated concentration profile being determined to approximate the first calculated concentration profile, using the selected constant radial temperature as a flux-weighted temperature.

The computer simulation method can include using the flux-weighted temperature to select a suitable fluid composition for injection into the electrical cable being simulated.

In lieu of or in addition to outputting the value of the new concentration, the computer simulation method can use the new concentration for the dielectric enhancement fluid component within each finite volume to determine a calculated concentration profile for the dielectric enhancement fluid component within the conductor shield and the insulation jacket of the simulated cable for the selected time period after the initial time, and use the calculated concentration profile to select a suitable fluid composition for injection into the electrical cable being simulated.

The computer simulation method can further include providing an empirical model of the dielectric performance of the simulated cable as a function of concentration of the dielectric enhancement fluid component, and using the empirical model and the calculated concentration profile for the dielectric enhancement fluid component within the conductor shield and the insulation jacket of the simulated cable to determine an estimate of dielectric performance changes for times after the initial time.

In yet another embodiment, a computer simulation method is disclosed for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time. The simulation method comprises:

for a selected length of the simulated cable, defining a plurality of radially arranged finite volumes extending the selected length of the simulated cable;

estimating the radial temperature of each finite volume;

for a selected time period after the initial time, performing at least once each of:

calculating the diffusion properties of the dielectric enhancement fluid component within each finite volume;

calculating the mass flux from one finite volume to another finite volume for the dielectric enhancement fluid component within the finite volumes; and combining the calculated change in mass of the dielectric enhancement fluid component within each finite volume with the calculated mass flux between each adjacent finite volume for the dielectric enhancement fluid component within the finite volumes to determine a new concentration for the dielectric enhancement fluid component within each finite volume; and outputting the value of the new concentration for the dielectric enhancement fluid component within each finite volume.

The computer simulation method can further include:

using the outputted value of the new concentration for the dielectric enhancement fluid component within each finite volume to determine a first calculated concentration profile for the dielectric enhancement fluid component within the conductor shield and the insulation jacket of the simulated cable for the selected time period after the initial time;

determining a constant radial temperature for each finite volume that results in a second calculated concentration profile for the dielectric enhancement fluid component within the conductor shield and the insulation jacket of the simulated cable for the selected time period after the initial time that approximates the first calculated concentration profile, by:

selecting a constant radial temperature for each finite volume to use in determining the second calculated concentration profile;

using the selected constant radial temperature, for a selected time period after the initial time, performing at least once each of:

calculating the diffusion properties of the dielectric enhancement fluid component within each finite volume;

calculating the mass flux from one finite volume to another finite volume for the dielectric enhancement fluid component within the finite volumes;

combining the calculated change in mass of the dielectric enhancement fluid component within each finite volume with the calculated mass flux between each adjacent finite volume for the dielectric enhancement fluid component within the finite volumes to determine a new concentration for the dielectric enhancement fluid component within each finite volume;

outputting the value of the new concentration for the dielectric enhancement fluid component within each finite volume using the selected constant radial temperature;

using the outputted value of the new concentration for the dielectric enhancement fluid component within each finite volume using the selected constant radial temperature to determine the second calculated concentration profile;

determining if the second calculated concentration profile approximates the first calculated concentration profile;

if the selected constant radial temperature does not result in the second calculated concentration profile being determined to approximate the first calculated concentration profile, selecting a new constant radial temperature to use in determining the second calculated concentration profile; and if the selected constant radial temperature does result in the second calculated concentration profile being determined to approximate the first calculated concentration profile, using the selected constant radial temperature as a flux-weighted temperature.

The computer simulation method can include using the flux-weighted temperature to select a suitable fluid composition for injection into the electrical cable being simulated.

In lieu of or in addition to outputting the value of the new concentration, the computer simulation method can use the new concentration for the dielectric enhancement fluid component within each finite volume to determine a calculated concentration profile for the dielectric enhancement fluid component within the conductor shield and the insulation jacket of the simulated cable for the selected time period after the initial time, and use the calculated concentration profile to select a suitable fluid composition for injection into the electrical cable being simulated.

The computer simulation method can further include providing an empirical model of the dielectric performance of the simulated cable as a function of concentration of the dielectric enhancement fluid component, and using the empirical model and the calculated concentration profile for the dielectric enhancement fluid component within the conductor shield and the insulation jacket of the simulated cable to determine an estimate of dielectric performance changes for times after the initial time.

In alternative embodiments, the computer simulation methods noted can at least partially fill the interstitial void volume at an initial time t=0, and perform the steps described for the selected time period for each of a plurality of different selected incremental time periods occurring after t=0.

In the described embodiments, the finite volumes can be a plurality of coaxial cylinders extending the selected length of the simulated cable.

In the described embodiments, the computer simulation method can simulate injection with a fluid composition comprising a plurality of dielectric enhancement fluid components. For the selected time period after the initial time, the steps are performed at least once for each of the dielectric enhancement fluid components.

A computer simulation system is also disclosed for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time. The system comprises:

means for defining a plurality of radially arranged finite volumes extending the selected length of the simulated cable for a selected length of the simulated cable;

means for estimating the radial temperature of each finite volume;

means for calculating the diffusion properties of the dielectric enhancement fluid component within each finite volume for the selected time period after the initial time using the estimated radial temperature of each finite volume;

means for calculating the mass flux from one finite volume to another finite volume for the dielectric enhancement fluid component within the finite volumes for the selected time period after the initial time using the estimated radial temperature of each finite volume;

means for combining the calculated change in mass of the dielectric enhancement fluid component within each finite volume due to chemical reactions with the calculated mass flux between each adjacent finite volume for the dielectric enhancement fluid component within the finite volumes for the selected time period after the initial time to determine a new concentration for the dielectric enhancement fluid component within each finite volume; and means for outputting the value of the new concentration for the dielectric enhancement fluid component within each finite volume.

The computer simulation system can also include means for calculating the change in mass of the dielectric enhancement fluid component within each finite volume due to chemical reactions for a selected time period after the initial time using the estimated radial temperature of each finite volume, and means for combining the calculated change in mass of the dielectric enhancement fluid component within each finite volume due to chemical reactions with the calculated mass flux between each adjacent finite volume for the dielectric enhancement fluid component within the finite volumes for the selected time period after the initial time to determine a new concentration for the dielectric enhancement fluid component within each finite volume.

The computer simulation system can also include means for using the outputted value of the new concentration for the dielectric enhancement fluid component within each finite volume to determine a calculated concentration profile for the dielectric enhancement fluid component within the conductor shield and the insulation jacket of the simulated cable for the selected time period after the initial time to select a suitable fluid composition for injection into the electrical cable being simulated.

The computer simulation system can also include means for storing an empirical model of the dielectric performance of the simulated cable as a function of concentration of the dielectric enhancement fluid component, and means for using the empirical model and the calculated concentration profile for the dielectric enhancement fluid component within the conductor shield and the insulation jacket of the simulated cable to determine an estimate of dielectric performance changes for times after the initial time.

The computer simulation system can also include:

means for using the outputted value of the new concentration for the dielectric enhancement fluid component within each finite volume to determine a first calculated concentration profile for the dielectric enhancement fluid component within the conductor shield and the insulation jacket of the simulated cable for the selected time period after the initial time;

means for storing a constant radial temperature for each finite volume that results in a second calculated concentration profile for the dielectric enhancement fluid component within the conductor shield and the insulation jacket of the simulated cable for the selected time period after the initial time that approximates the first calculated concentration profile;

means for calculating the diffusion properties of the dielectric enhancement fluid component within each finite volume for the selected time period after the initial time using the selected constant radial temperature;

means for calculating the mass flux from one finite volume to another finite volume for the dielectric enhancement fluid component within the finite volumes for the selected time period after the initial time using the selected constant radial temperature;

means for combining the calculated change in mass of the dielectric enhancement fluid component within each finite volume with the calculated mass flux between each adjacent finite volume for the dielectric enhancement fluid component within the finite volumes for the selected time period after the initial time to determine a new concentration for the dielectric enhancement fluid component within each finite volume;

means for outputting the value of the new concentration for the dielectric enhancement fluid component within each finite volume using the selected constant radial temperature;

means for using the outputted value of the new concentration for the dielectric enhancement fluid component within each finite volume using the selected constant radial temperature to determine the second calculated concentration profile; and means for determining if the second calculated concentration profile approximates the first calculated concentration profile, and if the selected constant radial temperature does not result in the second calculated concentration profile being determined to approximate the first calculated concentration profile, selecting a new constant radial temperature to use in determining the second calculated concentration profile, and if the selected constant radial temperature does result in the second calculated concentration profile being determined to approximate the first calculated concentration profile, using the selected constant radial temperature as a flux-weighted temperature.

This computer simulation system can also include means for calculating the change in mass of the dielectric enhancement fluid component within each finite volume due to chemical reactions for the selected time period after the initial time using the selected constant radial temperature, and means for combining the calculated change in mass of the dielectric enhancement fluid component within each finite volume due to chemical reactions with the calculated mass flux between each adjacent finite volume for the dielectric enhancement fluid component within the finite volumes for the selected time period after the initial time to determine a new concentration for the dielectric enhancement fluid component within each finite volume.

Also described is a computer-readable medium whose instructions cause a computer system to simulate an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time, by performing various ones of the steps described above.

Other features and advantages of the invention will become apparent from the following detailed description, taken in conjunction with the accompanying drawings.

DETAILED DESCRIPTION OF THE METHOD

Figure 1:
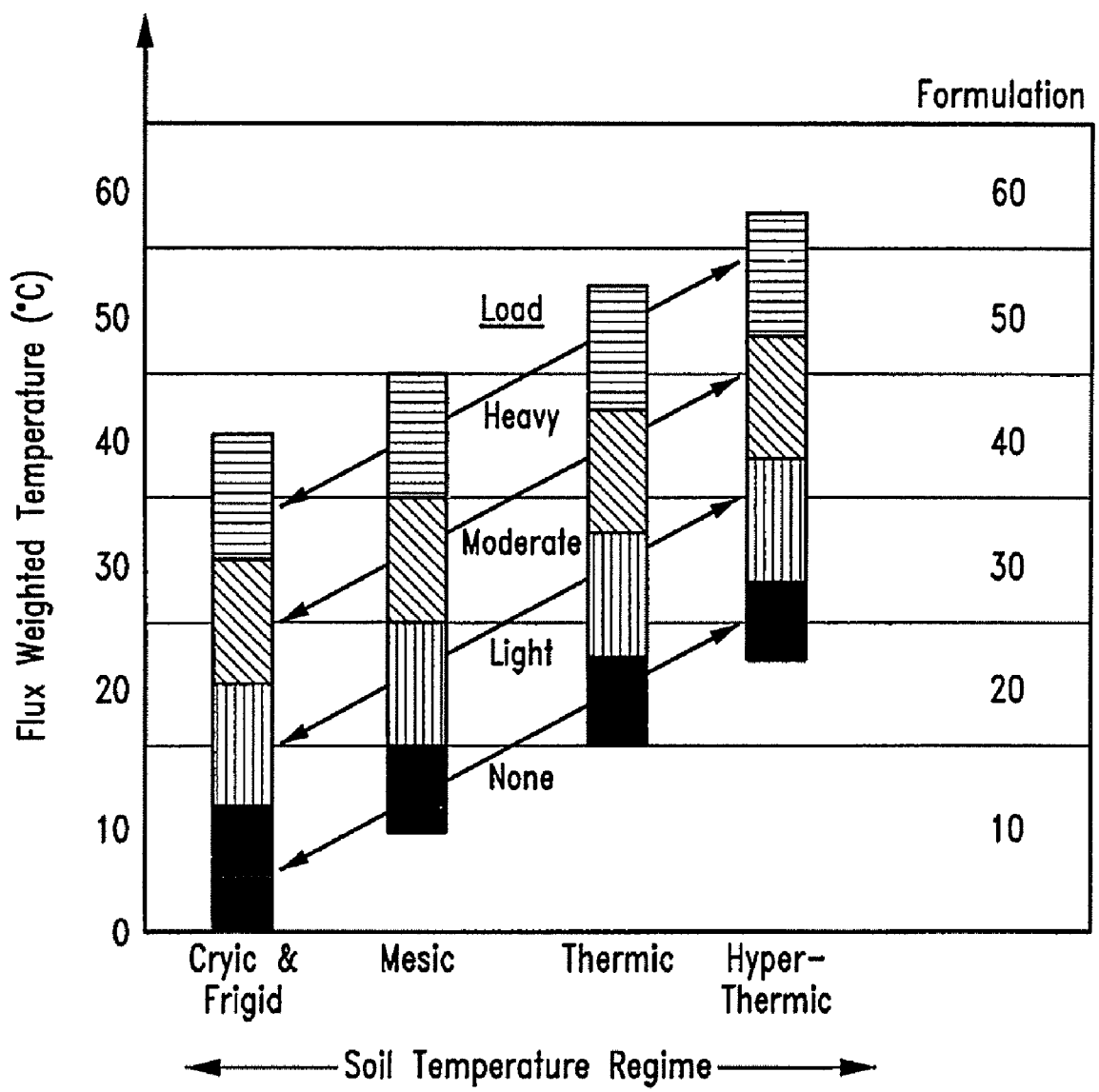
FIG. 1 is a plot of cable thermal classifications.

The instant method relates to the restoration of an in-service electrical power cable having a stranded conductor surrounded by a conductor shield encased in a polymeric insulation and having an interstitial void volume in the region of the conductor, wherein a dielectric enhancement fluid, or fluid composition, is injected into the interstitial void volume. The instant method uses a computer simulation method to predict the concentration profile for each chemical species of interest present at a given time after injection. Chemical species of interest include water, all components which were originally present in the injected dielectric enhancement fluid, and reaction products thereof, including by-products such as methanol or ethanol (i.e., byproducts of reaction of alkoxysilanes typically used in such cable restoration with adventitious water). The concentration profile, in turn, can be used to predict the alternating current breakdown (ACBD) performance or reliability of a given cable after it is treated. The instant method employs a computer simulation, which provides the following benefits and uses in five distinct modes:

R&D Mode

The performance of a dielectric enhancement fluid used to treat cables can be predicted for various cable geometries and operating assumptions knowing only the physical properties of the fluid. Formulation variations can be virtually tested to optimize performance without the usual cost and time associated with electrical aging experiments. Contrary to the above described determination of treatment efficacy, the instant simulation method requires only the gathering of various physical properties and employs a subsequent computer simulation to predict component performance, either alone or as part of a mixture. Such virtual experiments offer the benefit that many materials can be tested and optimized before an actual fluid formulation is chosen. Additionally, this optimization can be performed at any granularity, from an individual cable to classes of cables.

Regime Delineation Mode

One shortcoming of previous art methods, such as those described in U.S. Pat. Nos. 5,372,840 and 5,372,841 which rely on diffusivity measurements at 50° C., is the reliance on delineating certain classes of materials by physical properties (particularly diffusion and equilibrium concentration) at specific temperatures. Since cables operate at various temperature conditions depending upon, among other things, the temperature of the soils in which they are buried and the cycling load they carry, using a single arbitrary temperature to delineate the properties of materials is, at best, a compromise in precision and, at worst, an oversimplification which can distort reality to an unacceptable extent. To refine these classes, it is necessary to consider more than a single temperature. Further, it is only possible to adequately delineate the classes of dielectric enhancement fluid to be used for very long-term performance improvement (e.g., the slow to diffuse fluids described in Publication No. US 2005/0189130 and Publication No. US 2005/0192708) by first using the instant computer simulation to provide a framework for the classification of material properties. While there are an infinite number of possible geometry and time-dependent temperature profiles, the instant simulation allows this to be reduced to a manageable number which covers the majority of real world cases. The results of such simulations can then be used to select the types and amounts of dielectric enhancing fluid components which, when injected into an in-service cable, provide predictable dielectric breakdown performance for decades under the given operating conditions. These general cases can then be used in R&D mode, above, to test specific fluids within the case. In this mode, the simulation method permits one skilled in the art to reliably predict this performance without resorting to accelerated testing on actual cables, thereby saving both time and money. Moreover, while providing a good approximation of performance in view of the great complexity of the variables involved, the instant simulation method is believed to be superior to the current accelerated aging test method in predicting long-term post-treatment field reliability. Furthermore, as the amount of data increases over time (particularly field performance data) the statistical reliability of the instant simulation method will correspondingly improve.

Marketing Mode

The instant simulation method can be used to predict the reliability performance of competitive products, thereby strengthening marketing position of superior fluids and injection methods.

Pre-Injection Formulation Optimization Mode

With sufficient computer resources, it is possible to tailor individual formulations to customer requirements and cable conditions.

Post-Injection Performance Mode

After a cable is injected, its performance can be predicted when unforeseen changes in the operation of the cable are required or desired. As improved physical property data or improved theoretical or more useful empirical relationships become available, the performance can be reassessed to provide a refined reliable life estimate.

This allows the reassessment of anticipated performance in light of new information.

Granularity

As used herein, the term "in-service" refers to a cable which has been under electrical load and exposed to the elements, usually for an extended period (e.g., 10 to 40 years). In such a cable, the electrical integrity of the cable insulation has generally deteriorated to some extent due to the formation of water or electrical trees, as well known in the art. Further, the term cable "segment," as used herein, refers to the section of cable between two terminal connectors, while a cable "sub-segment" is defined as a physical length of uninterrupted (i.e., uncut) cable extending between the two ends thereof. Thus, a cable segment is identical with a sub-segment when no splices are present between two connectors. Otherwise, a sub-segment can exist between a terminal connector and a splice connector or between two splice connectors, and a cable segment can comprise one or more sub-segments. The instant simulation method applies equally to a segment and a sub-segment.

For each of the above five modes it is possible to use any level of granularity (i.e., the agglomeration of discrete cable lengths subjected to the instant computer simulation as a single integral unit), from that of an individual sub-segment of cable to entire classes of cables. Cables may be classified into groups by their geometry (i.e. conductor size, conductor compression, thickness of polymeric layers, presence or absence of an outer protective jacket, etc.), their materials (i.e. XLPE, HMWPE, EPR, etc.) and/or by their foreseeable dynamic temperature profiles. Consider the following examples which provide illustrations of some of the possible levels, from the smallest practical level of granularity to the greatest:

A 25-foot cable sub-segment which runs under an asphalt roadway. The soil around the cable is warmer due to absorption of more solar energy and hence the rate of fluid exudation from this sub-segment is higher than for the rest of the segment.

A single cable segment. While all the segments in a circuit are electrically connected in an ostensibly series arrangement, load decreases in segments which are remote from the source of power because current is drained off from each transformer in the series and from losses due to circuit impedance. Hence the cable nearest the source caries the greatest load and the cable farthest from the source carries the lowest load. A cable terminated on a stand-off bushing at the loop normally-open point has no load. As a consequence, the operating temperature of the remote segment is likely lower than that of a segment close to the power source.

3 segments of cable in a 3-phase circuit having a balanced load.

A circuit (half loop or radial feed) wherein are all of the cables have the same geometry and materials of construction.

A class of cables which have generally the same geometry and materials of construction and roughly the same thermal profile. One such useful thermal classification system is illustrated in FIG. 1.

Thermal Classifications of Cable Operation

Over 90% of underground cables in the world are buried in soils which have mean annual temperature ranges that can be conveniently grouped into the four soil regimes shown in the table below. It should be noted that, although the cable depth is typically 1 meter, these soil temperature regimes are defined by soil scientists at a depth of 0.5 meter.

| | |
|---|---|
| Cryic (or frigid) soil | 0-10° C. |
| Mesic soil | 8-15° C. |

-continued

| | |
|---|---|
| Thermic soil | 12-22° C. |
| Hyperthermic soil | 22-28° C. |

Further, many cables may be buried at depths other than 1 meter and correction to the temperature for such a cable depth may be required. That is, the soil temperature at cable depths other than 0.5 meters need to be corrected from the temperatures listed above and such corrections are well known in the art. Moreover, cables buried in these various thermal regimes can carry loads from zero (e.g., backup cables or radial feeds far from the power source) up to the maximum design capacity of the cable. For most cables, the maximum conductor design temperature is 90° C. but, for the purposes of the instant simulation method, it is useful to consider three ranges of flux-weighted temperature (defined infra) increase above the ambient soil temperatures, as follows:

| | |
|---|---|
| lightly loaded | <10° C. |
| moderately loaded | 10-20° C. |
| heavily loaded | >20° C. |

For the above four soil temperature regimes and three load conditions there would be 12 possible combinations, including some overlap, as shown schematically in FIG. 1. It would therefore be more convenient to formulate a smaller number of treatment regimes based on the flux-weighted temperature. For example, in FIG. 1, six formulations are selected, each formulation (numbered 10 to 60 at the right side of this figure) is a mixture including an extremely slow to diffuse component, a moderately diffusing component and, optionally, a fast to diffuse component which together in different ratios adequately covers the thermal ranges depicted in FIG. 1. Such specific catalyzed formulations are illustrated in Table 1, below, wherein catalytic amounts of tetraisopropyl titanate (TIPT) are used in proportion to the total amount of alkoxysilanes in a given formulation. In general, as the temperature rises, the amount of slow flux components (i.e., low diffusion coefficients and/or low equilibrium concentration in the cable insulation) is increased at the expense of the materials which exhibit higher flux, wherein "flux" refers to a radial mass transfer rate through the cable per unit length thereof.

TABLE 1

| | Formulation Number and Component Weight % | | | | | |
|---|---|---|---|---|---|---|
| Component | 10 | 20 | 30 | 40 | 50 | 60 |
| acetophenone | 18.00% | 15.00% | 12.00% | 9.00% | 6.00% | 3.00% |
| tolylethyl-methyl-dimethyloxysilane | 58.00% | 53.00% | 48.00% | 43.00% | 38.00% | 33.00% |
| 2-cyanobutyl-methyl-dimethoxy-silane | 4.03% | 12.00% | 19.97% | 27.94% | 35.91% | 43.88% |
| menthylanthranilate | 0.64% | 0.64% | 0.64% | 0.64% | 0.64% | 0.64% |
| avobenzone | 2.40% | 2.40% | 2.40% | 2.40% | 2.40% | 2.40% |
| octocrylene | 9.60% | 9.60% | 9.60% | 9.60% | 9.60% | 9.60% |
| ferrocene | 6.70% | 6.70% | 6.70% | 6.70% | 6.70% | 6.70% |
| TIPT | 0.63% | 0.66% | 0.69% | 0.72% | 0.75% | 0.78% |
| total | 100.00% | 100.00% | 100.00% | 100.00% | 100.00% | 100.00% |

The Instant Method Computer Simulation

Figure 2:
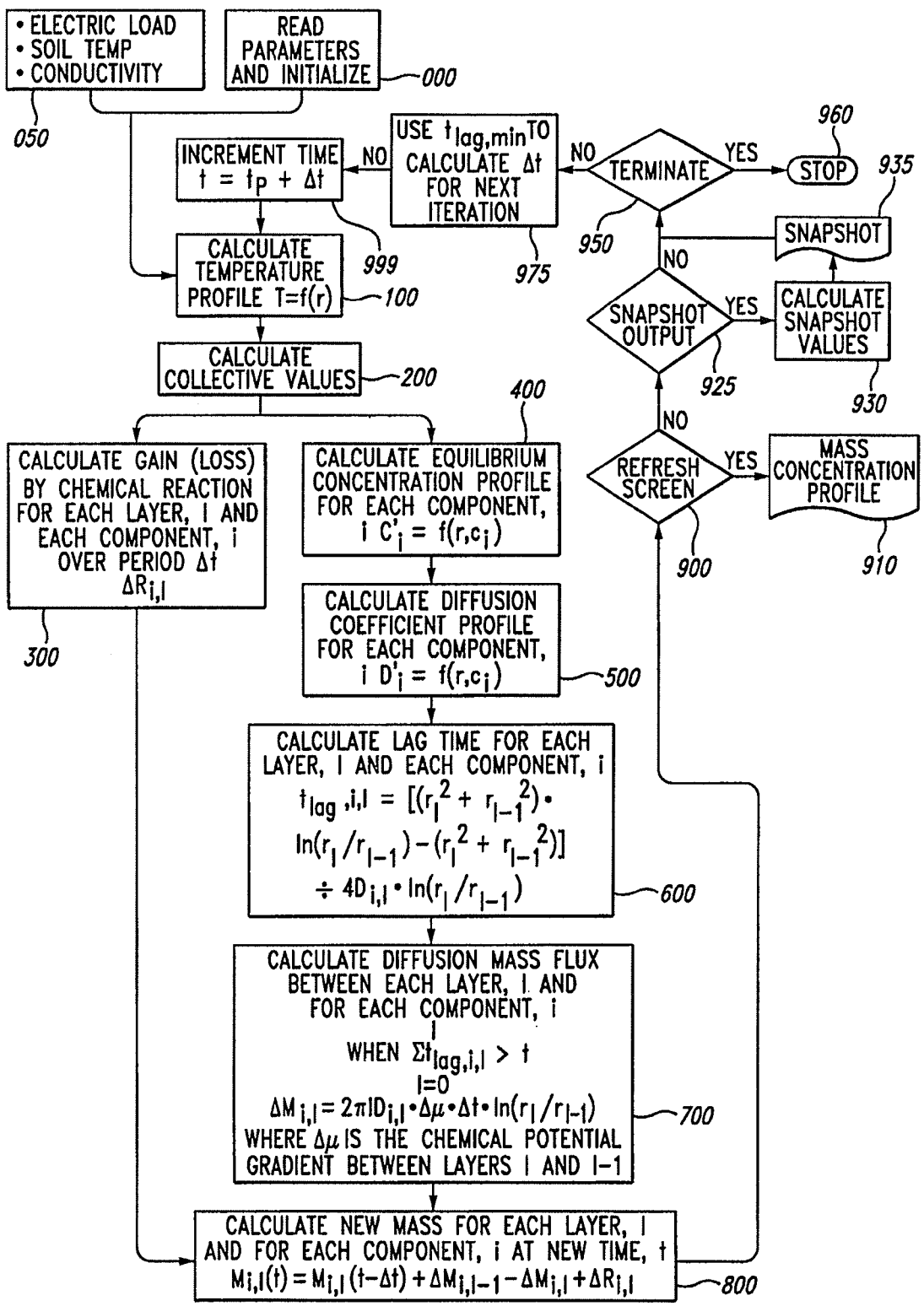
FIG. 2 is a schematic overview of the instant finite volume mass flux computer simulation.

FIG. 2 provides a schematic overview of a computational loop which is repeated for each time increment, $\Delta t$, until the desired simulation period ends. Each box of FIG. 2 has a 3-digit code which relates to a corresponding section of this disclosure and a step in performing the computer simulation, below. Each section, in turn, provides an overview of the calculations that are represented by the box.

Figure 3:
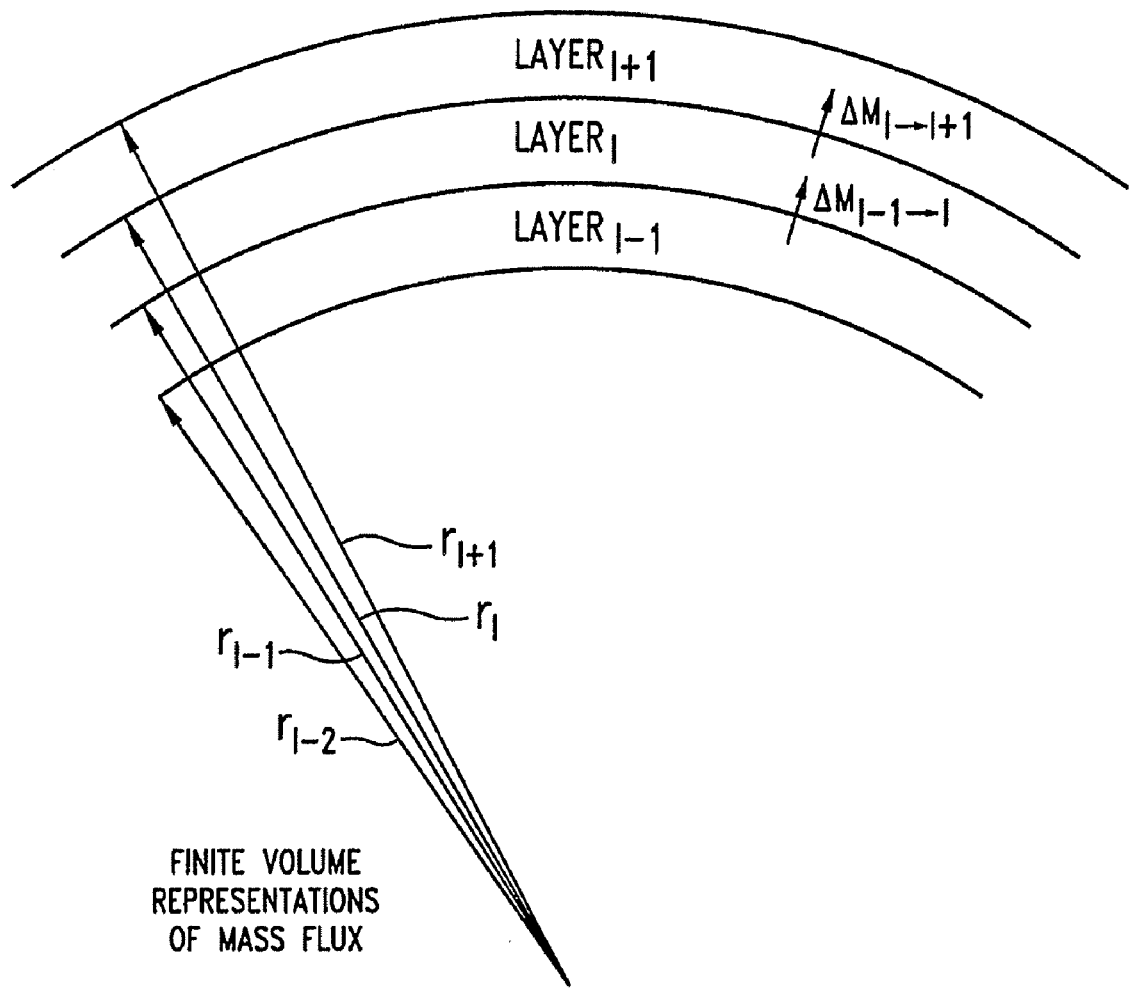
FIG. 3 is a finite volume representation of mass flux.

In the simulation, finite volumes are defined by coaxial cylinders stretching the length of the simulated cable segment or sub-segment. (Note: The singular exception to this cylindrical geometry is the innermost layer of the conductor shield which will be discussed in detail later and referred to as "layer zero" or $Layer_0$). Other than the innermost volume, the finite volumes are in the shape of coaxial annular bands or layers, or as used herein annular cylinders or simply "cylinders". Referring to FIG. 3, the cylinder corresponding to $Layer_i$ is defined by an inner radius $r_{i-1}$ and an outer radius $r_i$. As the number of layers or volume elements increases, the accuracy and the precision both increase at the expense of the computational power required to perform the simulation. In practice, a compromise is made between simulation resolution and the length of time required to perform the simulation.

Section 000

This section of the simulation allows the user to provide physical and geometric inputs to the simulation, including:

Time considerations, including the simulated length of the simulation, the date and time for the start of the simulation, the frequency at which data should be retained from the simulation for post-simulation analysis.

The geometry and materials of construction of the cable

The electric field distribution of the cable in kV/mm across the dielectric, which is easily calculated given the cable geometry and the operating voltage in kV. The electrical field affects the equilibrium concentration of polar materials in solid dielectrics, as predicted by the Clausius-Clapeyron equation. ([See Soma & Kuma, "Development of bow-tie tree inhibitor," IEEE 1990.) The injection pressure, and where a soak is used, the soak pressure and the soak duration.

The total quantity and composition of material supplied to the interstitial void volume. Note that the total quantity can generally be estimated from the actual pressure used and such an estimate will generally suffice. However, when actual quantities of fluid injected are measured, those measurements should be utilized.

The physical properties of each component in the dielectric enhancement fluid, along with water and products and by-products of chemical reactions including:
  Diffusion parameters, which allow the calculation of coefficients within each layer of the cable, within the temperature ranges of the simulation and within the concentration ranges of the simulation.
  Equilibrium concentration parameters of the components, which allow the calculation of coefficients within each layer of the cable, within the temperature ranges of the simulation, within the concentration ranges of the simulation, including binary interactions between components, and within any dielectric layers wherein the equilibrium concentration is influenced by an AC electrical field (i.e., equilibrium concentration for any molecule with a non-zero dipole moment).
  Molecular weight of the components (needed for chemical reaction molar balance calculations)
  Density of the components (needed to calculate pressure in the interstitial void volume of the cable).

The approximate seasonal water concentration in the soil is generally obtained from historical data. These historical-based predictions can be refined by climate modeling and micro-climate modeling when the cable transfers substantial energy into the soil. The U.S. Department of Agriculture provides this kind of data at their web site:. Ampacity calculations take the water content of the soil into account for accurate predictions as the water content has a significant effect on soil thermal conductivity.

Chemical reaction parameters including:
  Identification of the stoichiometry of all significant chemical reactions, including those involving any catalyst incorporated
  Reaction rate parameters
    Frequency factor
    Activation energy The void volume distribution or "halo" (further described below) within the dielectric layer of the cable. The halo can be measured by saturating a cable sample with a fluid and quantifying the concentration profile of the fluid across the radius of the insulation. The profile (i.e., a value over a distance (radius)) of the total water concentration minus the equilibrium water concentration in un-haloed polymer divided by the water density yields the halo profile (the profile is measured experimentally or generalized from data available in the literature).

Section 050

In this section, parameters which affect the operating temperature of the cable are entered. The user must provide temperature and thermal property inputs, each as a function of time over the lifetime of the simulation. At a minimum these inputs include the load in amperes, the soil temperature at cable depth (away from the heating influence of the cable), and the thermal conductivity of the soil. Examples of additional variables which may influence results and may be included as refinements where the effects are significant, include local conditions such as: 1) the layout of multi-phase circuits where the heat output of individual cables impacts the temperature of the soil surrounding adjacent cables, and 2) other sources of heat such as buried steam pipes. These inputs are used, along with the cable geometry and cable materials of construction, to provide the temperature at any radius (r) within the cable profile and at any time (t) over the anticipated post-treatment life using methods well known in the art. This is only for input calculations, and temperature distribution calculations will be discussed in Section 100 below.

Section 100

Using the parameters entered in Section 000 and 050, this section calculates the dynamic radial temperature profile for each finite volume layer.

Figure 5:
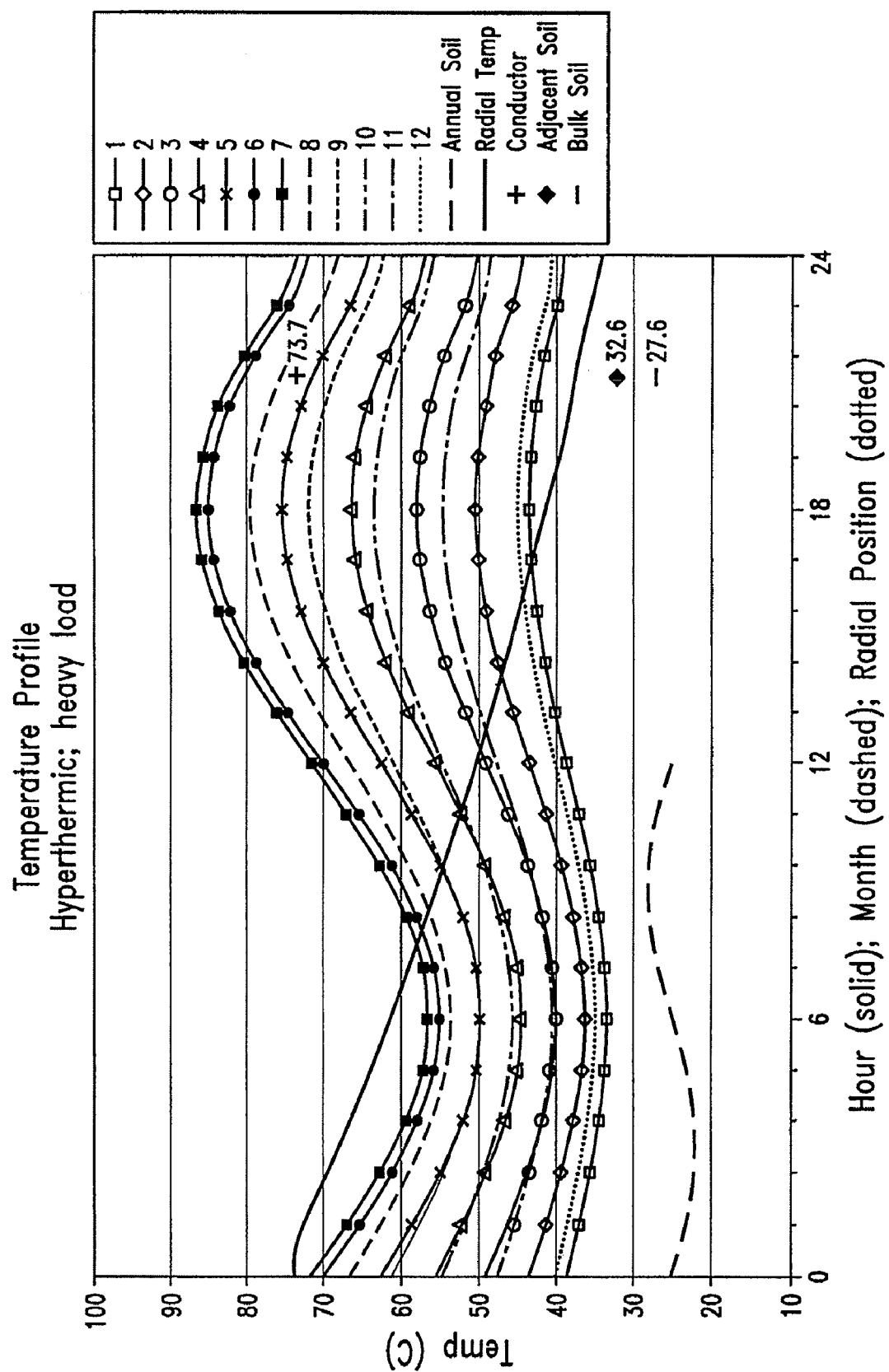
FIG. 5 is a plot of the temperature fluctuations typical of a heavily loaded cable in a hyperthermic soil.

If it is desired to mode a specific case, then the radial temperature profile as a function of time is available from finite element calculations, such as those described in Section 050, above, or calculated by software available from CYME International. Alternatively, since it makes little sense to employ computationally intensive finite element modeling methods to model general cases, a simplified model of temperature fluctuations may be used as a representation of general cases. FIG. 5 is just such a representation of a typical heavily loaded cable in a hyperthermic soil. A specific case would include planned loading profiles, for example a feed to a chemical plant might have an almost constant load, except during the annual 2 week maintenance shut-down. This is differentiated from a general case which exhibits a typical and generally sinusoidal temperature profile, as shown in FIG. 5.

Section 200

Using the parameters entered in Section 000 and 050 and the calculations in Section 100 and the conditions from the previous iteration of the loop, this section:

Calculates the collective values solute mass and total mass for each finite volume layer by summing the mass of each component of the dielectric enhancement material.

Calculates the approximate interstitial volume actually filled with material by dividing the total mass of material in the interstices by the sum of the products of each component density and its respective mass fraction.

Calculates the concentration of each component of the fluid in terms of mass per unit volume.

Calculates the pressure of the remaining mass in the interstices as the various components of the dielectric enhancement fluid diffuse into the insulation jacket where there is no soak bottle attached to the cable. A good approximation can be obtained with a linear pressure decrease from the initial pressure to zero as the mass decreases from its original mass to the mass which can fit without any pressure in the interstitial space.

Determines whether the pressure in the interstices is sufficiently high that a "layer zero" (See $Layer_0$ in FIG. 4) zero-by-pass condition exists (i.e. the pressure is high enough that fluid flows along the outer circumference of the outer strands and effectively can permeate directly into $Layer_1$). Layer zero is the portion of the conductor shield which is extruded between the outermost strands of the conductor strand bundle. When interstitial pressures are low, there is a bottleneck in mass flux between the interstices and all layers of the polymer from $Layer_O$ outward. This limited area, represented in one dimension by the smallest arc in FIG. 4 and in the other dimension by the length of the cable under consideration, is a tiny fraction of the area represented by the largest arc and the same cable length, which would be available for diffusion if $Layer_O$ were bypassed. The ratio (small to large) of these two areas is the $L_O$ restriction.

Section 300

Using the parameters entered in Section 000 and 050 and the calculations from 100 and 200, this section:

Calculates the change in mass resulting from all significant chemical reactions, including the parallel reaction routes which result from the presence of catalysts, for each finite volume element and for each component of the dielectric enhancement fluid.

Converts all concentrations to molar concentrations (g-moles/cm³).

For a typical hydrolysis or condensation reaction of A+B+C→D, the rate equation is $$-r_A = kC_A C_B C_C$$

wherein $C_A$, $C_B$, $C_C$ denote the molar concentrations of components A and B and catalyst C, respectively, k is a rate constant and $r_A$ is rate of the reaction of component A. The rate constant is, in turn, a function of temperature:

$$k = k_0 e^{-E/RT}$$

where $k_0$ is the frequency factor, E is the activation energy, R is the ideal gas constant, and T is the absolute temperature. The chemical reaction rate equations for each reactive component are solved simultaneously and the form of the equation may vary from the above example. Not to be confused with the ideal gas constant R just described, $\Delta R_{i,l}$ is the net change in mass of each component, i, within each finite volume element, l. This net change in mass from chemical reaction is next used in Section 800, as described below.

Section 400

Using the parameters from 000 and 050 and the calculations from Section 100 and 200, this section calculates the equilibrium concentration profile for each component of the dielectric enhancement fluid within each layer at the given simulation time. The equilibrium concentrations are determined in three steps and incorporate the following considerations: (1) pure component equilibrium concentration, including the effect of the electrical field, as predicted by the Clausius-Clapeyron equation of phase transition, (2) effect of component interactions, and (3) the effect of the halo within the insulation.

Pure Component Equilibrium Concentration

Utilizing an Arrhenius exponential function, or any empirical function that has been fitted to the data over the temperature range of interest, the pure component equilibrium concentration, Ci, as a function of temperature for each component and in each finite volume element, is determined. Not only does the pure component equilibrium concentration vary with temperature, but it varies with the composition of the material of the respective finite volume. Thus, separate functions are required for each of the following layers, if present, in the cable construction: conductor shield, insulation jacket, insulation shield, and jacket material(s). The only layer that supports a significant electrical field is the insulation layer and an adjustment to the pure component equilibrium concentration should be made. This adjustment can be accomplished either with experimental measurements fitted to an empirical function or, where relative permittivity values of the component in the liquid and vapor phases and the permittivity of the insulation are known, the Clausius-Clapeyron formula can be used to provide estimated adjustments. The solubility increases for high DK materials in higher electrical fields are shown by Soma & Kuma, "Development of bow-tie tree inhibitor," IEEE 1990]

Component Equilibrium Concentration with Component Interactions

The equilibrium concentration of any individual component in a polymer phase is impacted by the presence of other components dissolved in the polymer phase. A variety of mathematical methods may be utilized to model the component interactions. One useful model is provided below to illustrate the concept. The component (i) equilibrium concentration, which is adjusted for the presence of other components, is denoted by $C'_i$. For the interstices, there is no interaction with a polymer, so $C'_i$ equals $C_i$. For all polymeric or rubber layers:

$$C'_{i,l} = C_{i,l} \cdot \frac{m_{i,l}(\text{for component } i \text{ \& layer } l)}{\sum m_{i,l}(\text{for all components } i \text{ \& layer } l)} \alpha_i$$

wherein m is the mass in grams and alpha ($\alpha_i$) is an empirical coefficient having a value between 0 and 1 which models the departure from ideal solution behavior. This empirical coefficient can be determined experimentally in at least two ways. In the first, experimental data, as described below in "Example of the instant simulation method in a Marketing Mode," is utilized to adjust the $\alpha_i$ function to fit data such as those shown in FIG. 9. In the second, polymer slabs can be exposed to known quantities of material pairs. The slabs can be sacrificed and the concentration of the binary pairs can be quantified. With all values directly measurable except $\alpha_i$, the latter constant can be calculated directly for the component pair. For the materials and temperature ranges of interest, the total component equilibrium concentration in any polymer layer remains relatively low (i.e., the total concentration is typically below 0.1 g/cm³). For most systems, the interactions of component pairs in such dilute polymer solutions can be adequately modeled using only the binary interactions of solute components. The dilute nature of the solution allows tertiary and higher interactions to be ignored without significant impact on the accuracy of the calculations. However, where higher-order interactions are significant, they can likewise be measured, albeit with a large number of experiments.

Figure 8:
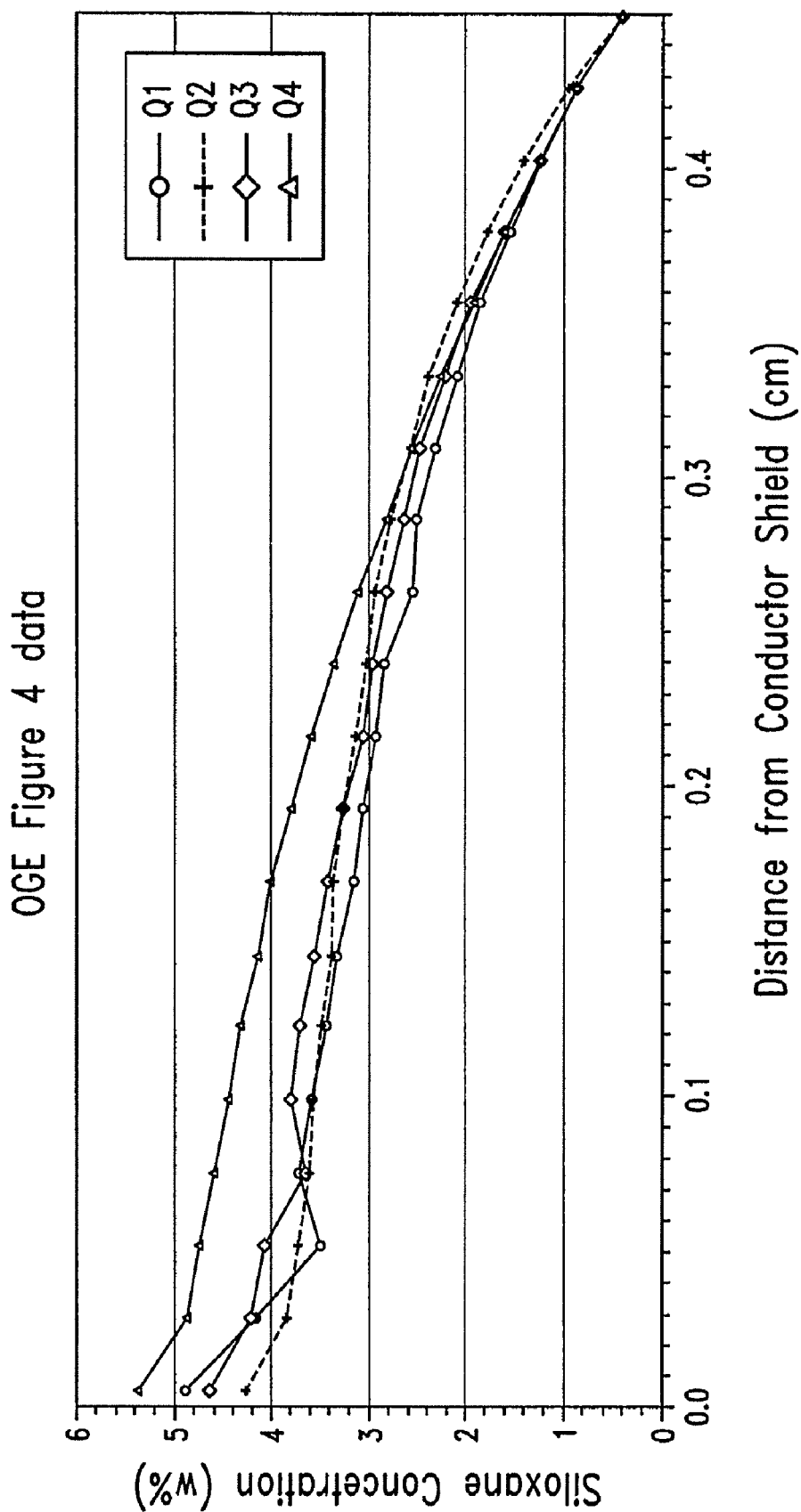
FIG. 8 is a plot of published data for OGE 15 kV 750 kcmil cable after 14 months of field aging "Cable fault prevention using dielectric enhancement technology," Mokry et al, Jicable 1995.
Figure 9:
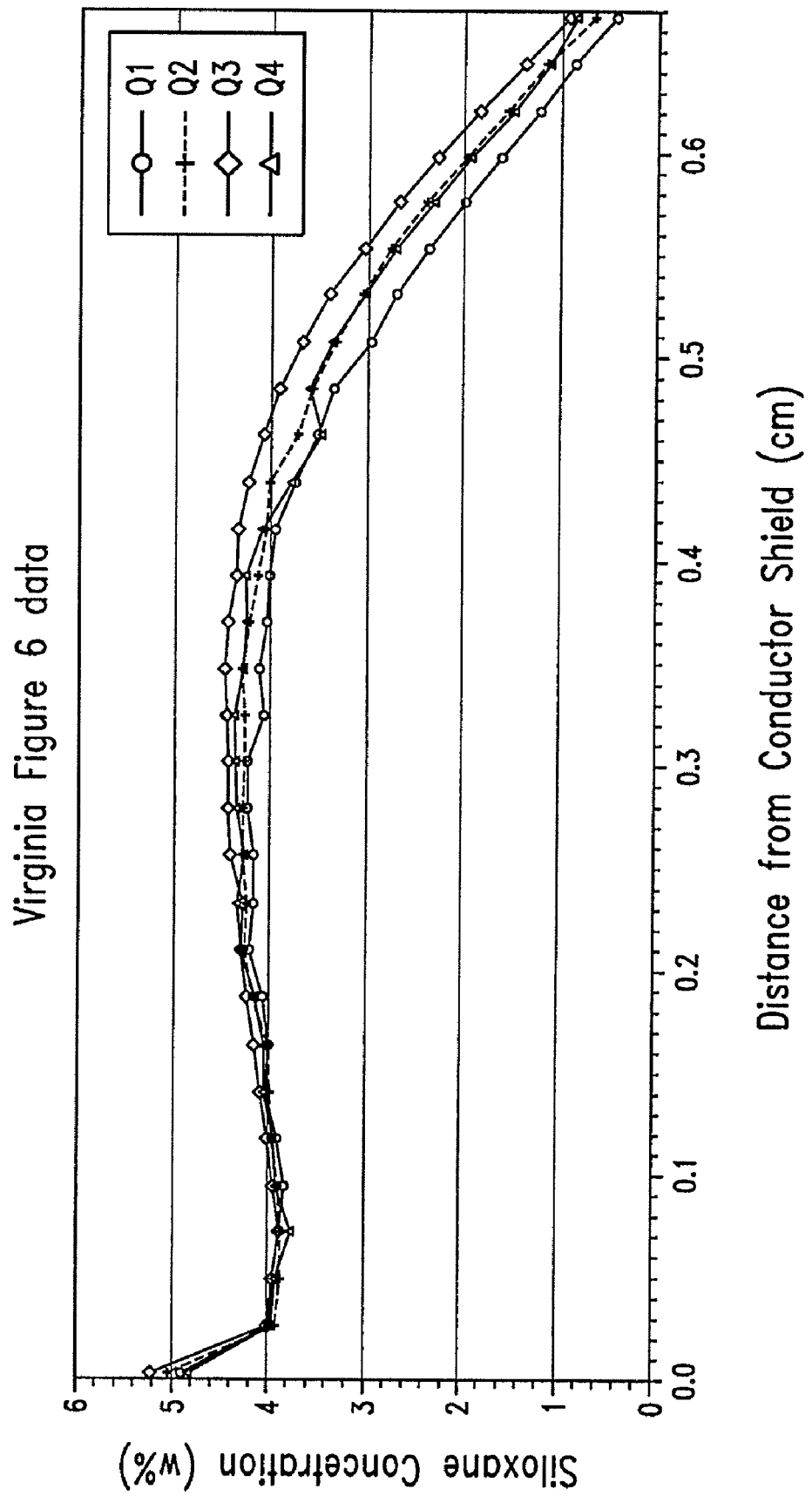
FIG. 9 is a plot of published data for Virginia Power energized but unloaded 35 kV, 1000 kcmil cable 15 months post-treatment "Cable fault prevention using dielectric enhancement technology," Mokry et al, Jicable 1995.
Figure 10:
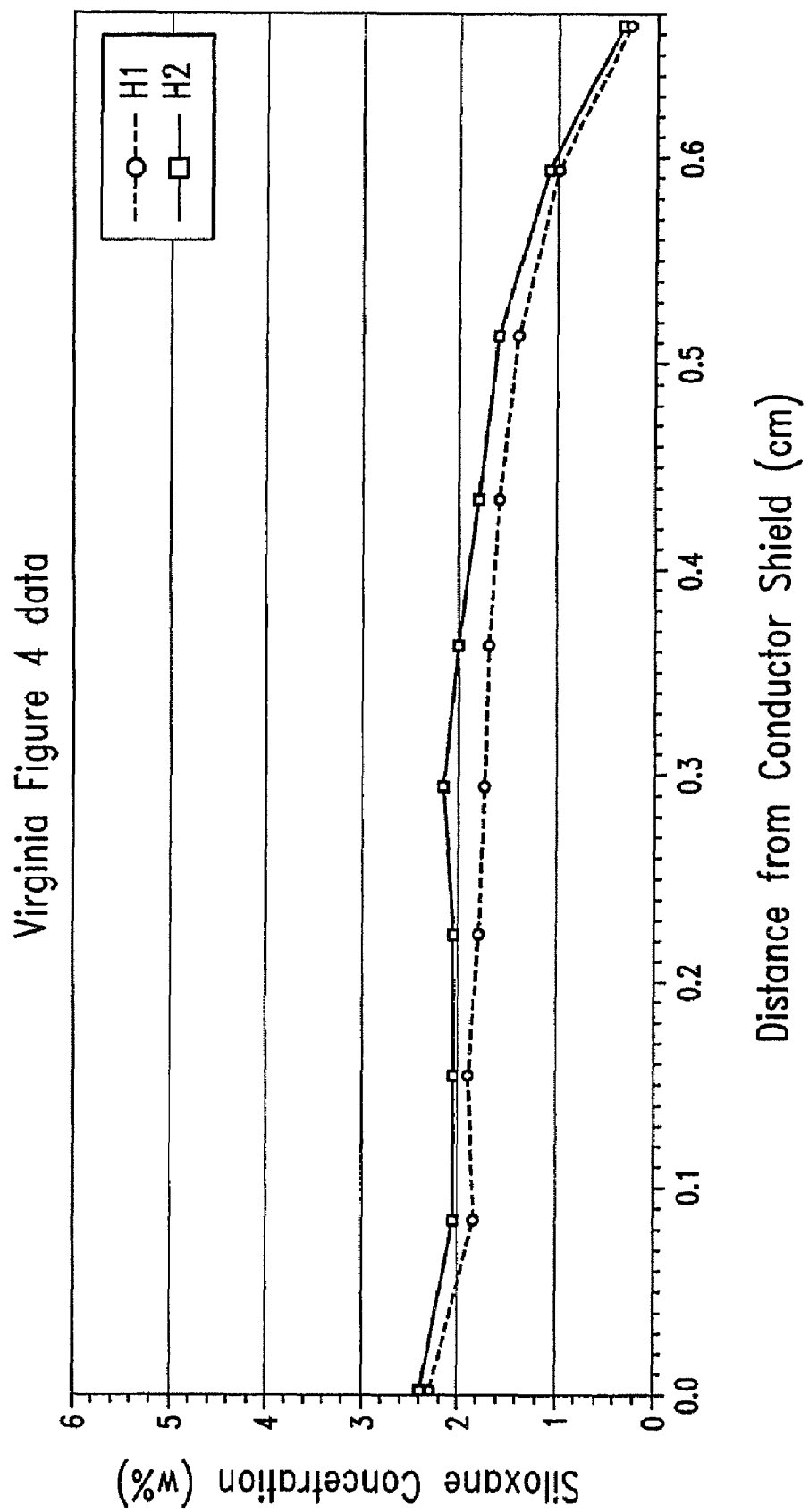
FIG. 10 is a plot of published data for Virginia Power energized but unloaded 35 kV, 1000 kcmil cable 70 months post-treatment "Fourth Generation Dielectric Enhancement Technology," Jenkins & Bertini, Jicable 1998.

Component Equilibrium Concentration with Fluid Interactions Plus Halo in Insulation A halo is a dispersion of micro voids in the dielectric material (i.e., the insulation) and is generally caused by repeated thermal cycling while the material is saturated with water. Current in a cable generally cycles over a 24 hour period between maximum and minimum values. As a consequence, the temperature of the cable cycles with the same frequency. The equilibrium concentration of water in the dielectric is a strong function of temperature and, as the temperature increases, more water permeates into the cable. As the temperature decreases, the water attempts to retreat from the cable, but it cannot do so fast enough to avoid supersaturation, particularly near the middle of the insulation layer. The water condenses out of the polymer phase and forms water-filled micro voids. The volume of halo micro voids in each finite volume element, $H_l$, forms an approximately normal distribution which can be fit to comport with measured values obtained with a micro infrared scan of the wet insulation or a Karl-Fischer titration thereof. Each component of the dielectric enhancement materials, water and any products or by-products of their chemical reactions in the void volume of the halo is in dynamic equilibrium with the same component in the polymer matrix. The component distribution in the halo is proportional to the actual amount of component in the finite volume element and the equilibrium concentrations of those components in the finite volume element. The halo adjusted equilibrium concentration, $C''_{i,l}$ is:

$$C''_{i,l} = C'_{i,l} + H_l \cdot [\omega \cdot C'_{i,l}/\Sigma C'_{i,l} + (1-\omega) \cdot m_{i,l}/\Sigma m_{i,l}]$$

wherein ω (omega) is an empirical weighting factor with a value between 0 and 1 which is adjusted to fit experimental data of the type provided in FIGS. 8 and 9.

Section 500

Using the parameters input in Sections 000 and 050 and the calculations from Sections 100, 200, and 400, this section calculates the diffusion coefficient profile, $D_{i,l}$, of each component, i, and for each finite volume layer, l, as a function of temperature and concentration. There are a number of suitable empirical relationships to accommodate the temperature and concentration dependence of diffusion, the equation below being illustrative:

$$D_{i,l} = A_i \cdot 10^{-Q_i/T_l} \cdot e^{\xi_i \cdot \sum X_{i,l}}$$

wherein $A_i$ and $Q_i$ are empirical constants for component (i) which reflect the change in diffusion with temperature at infinite dilution, $\xi_i$ is an empirical constant for component i which reflects the concentration dependence, $\Sigma X_{i,l}$ is the concentration of all solute components (i=1-n, where n is the number of solutes) in element l, and $T_l$ is the absolute temperature of finite element, l. There are a wide variety of methods well known in the art to gather diffusion data at various temperatures and concentrations which can then be fitted to the above equation using a least-squares or similar regression approach. One method often employed is to immerse a slab sample of polymer in the fluid of interest at a constant temperature. The slab is periodically removed from the fluid and weighed to generate a curve of weight gain versus time. Using the formulae and method described in *Engineering Design for Plastics*, 1964, edited by Eric Baer, Chapter 9: Permeability and Chemical Resistance, equation (26) on page 616 provides that the diffusion coefficient as a function of time (t) to half saturation is: Thus, this section calculates a new D for each layer, l, and each delta-t, $$D = 0.04939/(t/\lambda^2)_{1/2}.$$

where λ is the slab sample thickness and the subscript designates the half-saturation condition.

Section 600

Using the parameters of Sections 000 and 050 and the calculations from Sections 100, 200, 400, and 500, this section calculates the lag time, $t_{lag,i,l}$, defined herein as the time it takes a molecule of a component to traverse the thickness of a given cylindrical layer, for each component, i, and each finite volume element, l, as described in Crank & Park, *Diffusion in Polymers*, p. 177 (1968), equation for "A." This expression applies to a cylinder having a single homogenous composition, as is the case for each finite volume element of the instant simulation method.

$$t_{lag,i,l} = [(r_l^2 + r_{l-1}^2) \cdot \ln(r_l/r_{l-1}) - (r_l^2 - r_{l-1}^2)] \div 4 D_{i,l} \cdot \ln(r_l/r_{l-1})$$

Section 700

Using the parameters of Sections 000 and 050 and the calculations from Sections 100, 200, 499, 500, and 600, this section calculates the mass flux ($\Delta M_{i,l}$) for each component, i, and between each finite volume element, l, when $$\sum_{l=0}^{l} t_{lag,i,l} > t$$

where t is the cumulative elapsed simulated time, and $t_{lag,i,l}$ is the time lag for each component, i, and within each finite volume element, l. Permeation between adjacent finite element layers can only occur where the sum of the time lag values for each component from finite volume element 0 (zero), to the outermost of the two finite volume elements, l, is greater than the elapsed simulation time, t. When the lag time constraint is satisfied, $$\Delta M_{i,l} = 2\pi L \, D_{i,l} \cdot \Delta \mu_l \cdot \Delta t \cdot \ln(r_l/r_{l-1})$$

where $\Delta\mu_l$ is the potential gradient in mass per unit volume, as described below, between layers l and l−1, L is the length of the cable segment or sub-segment and $\Delta t$ is the time increment for this simulation iteration loop. The potential gradient between two adjacent finite volume elements, $\Delta\mu_l$, can be approximated more than one way. An example of one approximation is provided below to illustrate the concept.

For cases where $X_{i,l}/C'_{i,l} > X_{i,l+1}/C'_{i,l+1}$ $$\Delta\mu_l = X_{i,l+1} - C'_{i,l+1} \cdot X_{i,l}/C'_{i,l}$$

and where $X_{i,l}/C'_{i,l} < X_{i,l+1}/C'_{i,l+1}$ $$\Delta\mu_l = -X_{i,l} + C'_{i,l} \cdot X_{i,l+1}/C'_{i,l+1}$$

It should be noted that, within the insulation layer, C''', which accommodates the halo, is substituted for equilibrium concentration C' in the four expressions above and the other symbols have their previous definitions.

Section 800

Using the parameters of Sections 000 and 050 and calculations from Sections 100, 200, 300, 400, 500, 600, and 700, this section sums the absolute mass of the previous iteration ($M_{i,l}(t-\Delta t)$) for each component, i, in each finite volume element or layer, l, with the mass flux ($\Delta M_{i,l}$) into and out of each finite volume element and the net chemical reaction, $\Delta R_{i,l}$ to yield the new absolute mass, $M_{i,l}(t)$.

$$M_{i,l}(t) = M_{i,l}(t-\Delta t) + \Delta M_{i,l-1} - \Delta M_{i,l} + \Delta R_{i,l}$$

where $M_{i,l}(t)$ represents absolute mass, t is the current elapsed simulation time, $(t-\Delta t)$ is the elapsed simulation time of the previous iteration, and all of the "delta" terms represent the respective variable changes calculated over the increment $\Delta t$.

Sections 900-950

These sections control program output to a display screen as well as files and program termination when the simulation is completed.

Section 975

This section calculates the Δt for the next iteration. In practice, the dynamics (i.e. the lag times for the fastest to diffuse components which were calculated in Section 600) of the previous iteration are used to optimize the Δt. From trial and error experience, a factor (this lag time multiplication factor may generally be as high as 3 to 10) is multiplied by the smallest lag time of the previous iteration to establish a new Δt. Too large a Δt causes the calculation to become unstable and potentially fail; too small a Δt while increasing accuracy and numerical stability, uses greater computational resources. Generally the most dynamic element will establish the required Δt (i.e. the most dynamic element has the minimum Δt). To reduce the number of required calculations and to enjoy the economy of rapid computations, whole number factors can be established between the most dynamic element (very often the diffusion of water) and at least one, or even more preferably, most of the less dynamic elements. For example, if the calculated lag time for the diffusion of water in one finite element was 3 seconds and the lag time for a particular chemical reaction was 61 seconds, a whole number factor such as 20 (61÷3, rounded to a whole number) could be assigned to the chemical reaction such that the reaction equations are solved once every 20 iterations.

Section 999

This section increments the time, t by Δt and begins another iteration loop at Section 100.

EXAMPLES

The various utilities (modes) of the above described simulation will now be illustrated by way of non-limiting examples to further clarify the different embodiments of the instant simulation method.

Example of the Instant Simulation Method in a Regime Delineation Mode

In the following example an embodiment of the instant simulation method is illustrated wherein the computer simulation is utilized to provide the distribution of fluid components in a cable and facilitate convenient grouping of commonly occurring cases of similar conditions, as illustrated in FIG. 1. This grouping of similar situations avoids the impracticality of dealing with the vast number of possibilities individually.

For illustrative purposes, consider a typical cable segment carrying a heavy current load in a hyperthermic soil which experiences the temperature fluctuations depicted in FIG. 5. The seasonal fluctuation of the bulk soil temperature is shown by the lower dashed sinusoidal curve as a function of time in months (ranging from 0 to 12 months on the x-axis). The upper 12 sinusoidal curves indicate the daily (0-24 hours on the x-axis) average fluctuations in conductor temperature for each of the 12 months of the year. The solid monotonically declining line describes the radial temperature profile across the cable conductor shield, insulation, and insulation shield at a particular simulated moment (e.g., 3:45 PM on Aug. 31, 2010), the corresponding abscissa being scaled such that zero represents the innermost radius of the conductor shield and 24 represents the outermost radius of the insulation shield. It is further assumed that the above cable segment is 220 feet long and is of the following construction: unjacketed; 15 kV, 100% insulation (180 mil); 1/0, 19-strand, aluminum concentric conductor. The cable is injected (virtually) at time t=0 (e.g., noon; Jun. 2, 2005) with 839 grams of a two-component dielectric enhancement fluid mixture consisting essentially of 755 grams of menthylanthranilate and 84 grams of ferrocene. The mass of fluid supplied is the mass which would be supplied and confined at a pressure of 100 psig according to the method described in Publication No. US 2005/0189130, cited above.

Figure 6:
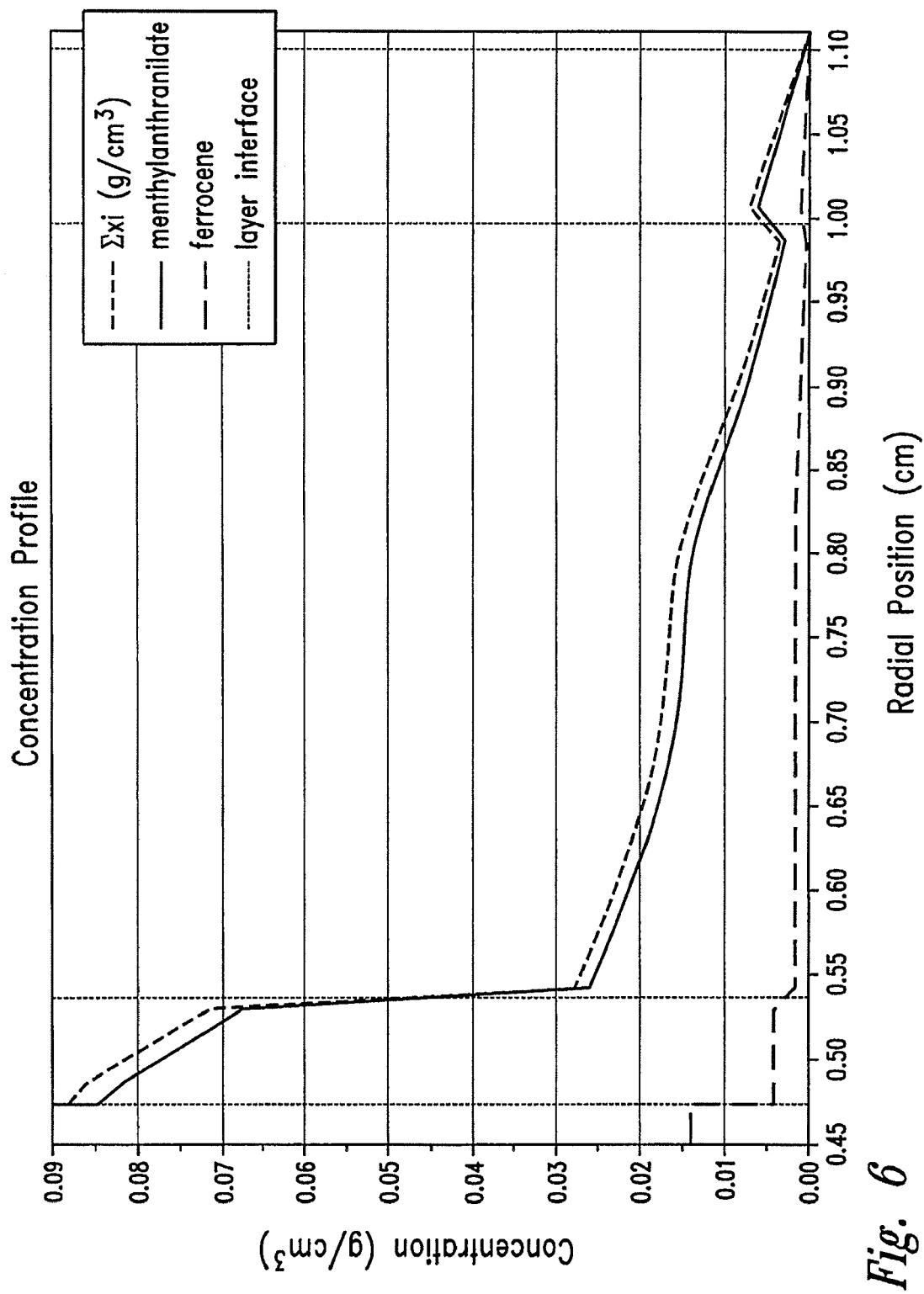
FIG. 6 is a plot of the radial concentration profile 5¼ years after treatment with a menthylanthranilate/ferrocene fluid mixture.
Figure 7:
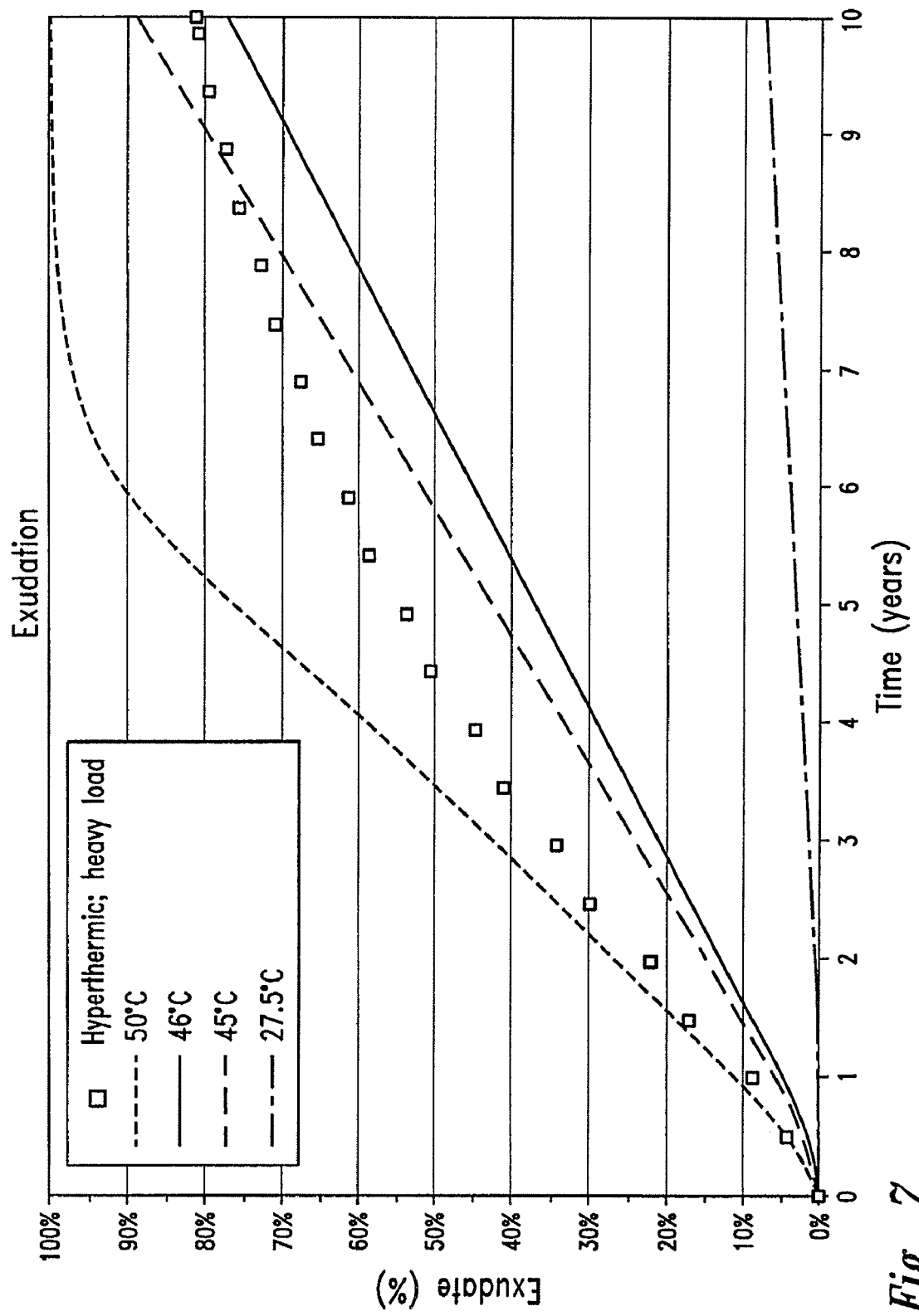
FIG. 7 is a plot of the cumulative exudation of the fluid mixture of FIG. 6 from the insulation.

From the computer simulation described above, the approximate radial concentration distribution of each component of the above fluid mixture, as well as the total thereof, is provided in FIG. 6 for a time t=5¼ years after the virtual injection. In this figure, the respective component weight percentage is plotted against radial position in the cable and each interface between the various layers of the cable is delineated with a vertical demarcation line. Thus, working from left to right, the first interface is between the stranded conductor and the conductor shield, then between the conductor shield and the insulation, then between the insulation and the insulation shield, and, finally, between the insulation shield and the hyperthermic soil in which the cable is buried. The curve for each component of FIG. 6, which is an output provided in Section 910 of the above simulation, can be numerically integrated with respect to radial position out to the outermost layer of the insulation and results then summed and finally subtracted from the initial total amount of fluid injected at t=0 to provide the total amount of fluid which has exuded from the cable at the above simulation time. Thus, for example, according to the computation of this simulation at 5¼ years after virtual injection (treatment), over half of the fluid supplied has exuded from the insulation. The cumulative exudation at various times is, in turn, plotted in FIG. 7 as the data points labeled "Hyperthermic; heavy load". Plotted alongside the data for the above example cable, which shows the respective points for simulations up to year 10 after virtual injection, are a series of assumed isothermal simulations between 27.5° C. and 50° C. (i.e., the temperature of the cable and the soil are assumed to be constant throughout each simulation), as indicated in the legend of FIG. 7. The assumed isothermal temperature of each subsequent simulation is chosen with the objective of matching the value of the virtual exudation curve at the end point of interest. For example, if the customer specified reliability requirement, as defined infra, is 10 years after actual treatment, the isothermal temperature which best matches the exudation curve at 10 years after virtual injection lies between 45 and 46° C. This isothermal temperature which most closely matches the exudation rate profile of the field cable at the customer specified design life is defined herein as the "flux-weighted temperature" according to the instant simulation method. For this example, with a customer specified reliability requirement corresponding to about an 80% exudation level (i.e., 80 wt % of the total fluid introduced is predicted to exuded from the insulation after 10 years), that temperature is approximately 45.3° C. and the45.3° C. isothermal exudation linewould cross the "Hyperthermic; heavy load" line at about post-treatment year 10.

In practice, of course, cable owners would not specify the above mentioned exudation value. Instead, they specify a dielectric reliability requirement. Thus, the cable owner can predict the approximate AC breakdown value of particular circuits utilizing at least one of several known methods:

Operational reliability history of the circuit, adjacent circuits, or similar circuits is predictive.

Samples of a population of cables can be excavated, analyzed, and assumptions about the performance of the population can be inferred.

Diagnostic tests, such as partial discharge or isothermal relaxation current, provide approximations of cable reliability performance.

Furthermore, it is well known in the art what AC breakdown performance is required to provide a desired level of reliability. One useful benchmark is that of Steennis (E. Frederick Steenis, "Water treeing: the behavior of water trees in extruded cable insulation", KEMA, $2^{nd}$ edition 1989). After extensive testing and comparison to operational reliability, it was found that, within the population of the cables tested which exhibited AC breakdown performance above 16 kV/mm (63% probability), none had ever failed in service. Thus, a customer might specify AC breakdown performance of 18 kV/mm for circuits with very high reliability requirements (e.g., hospitals, military facilities, electronic media broadcasters, emergency responder facilities, and manufacturing facilities) and perhaps a lower value such as 16 kV/mm for circuits that feed less critical applications, such as residential neighborhoods.

Figure 11:
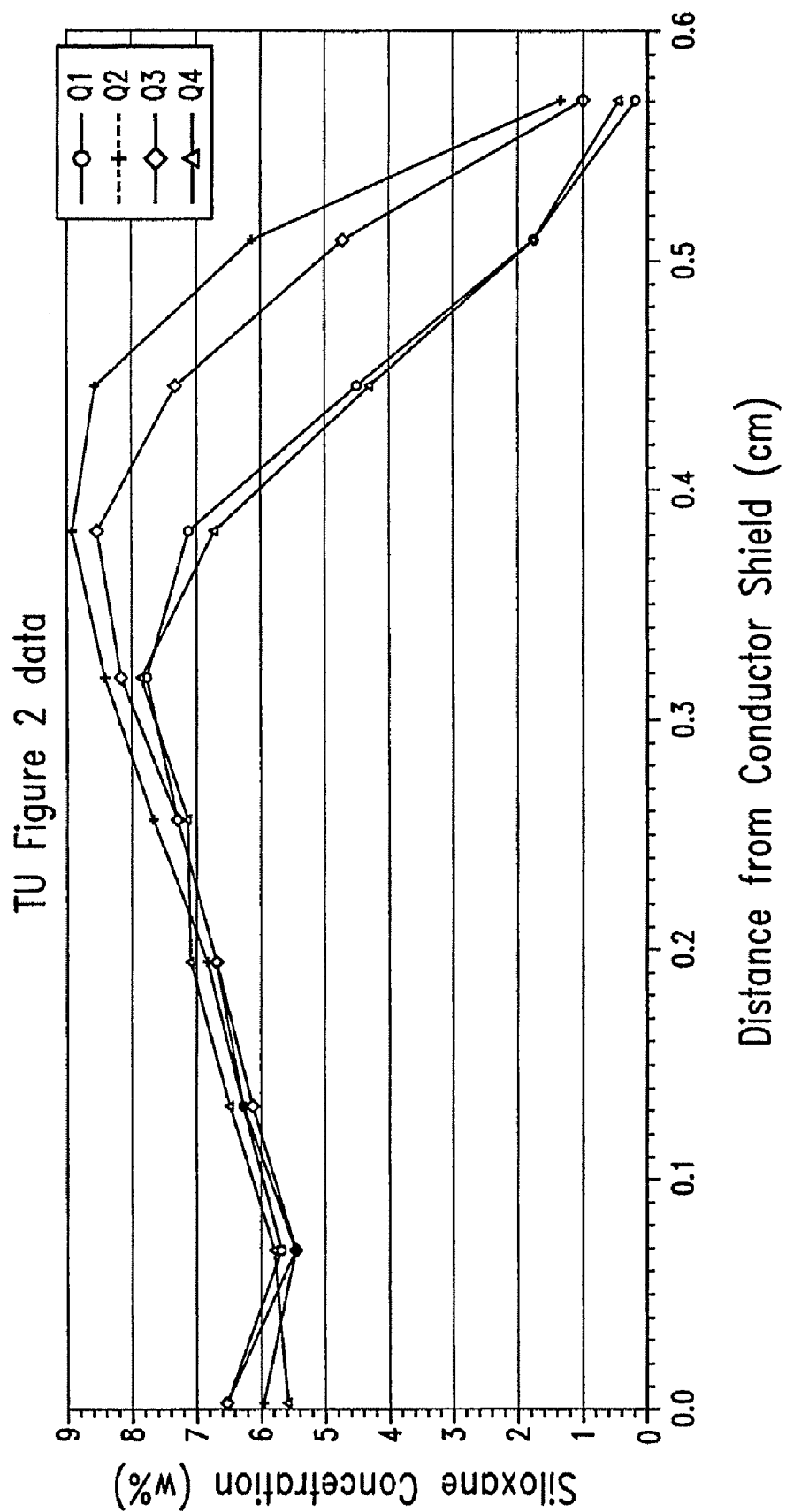
FIG. 11 is a plot of Texas Utilities Field Failure from U.S. Pat. No. 6,162,491.
Figure 12:
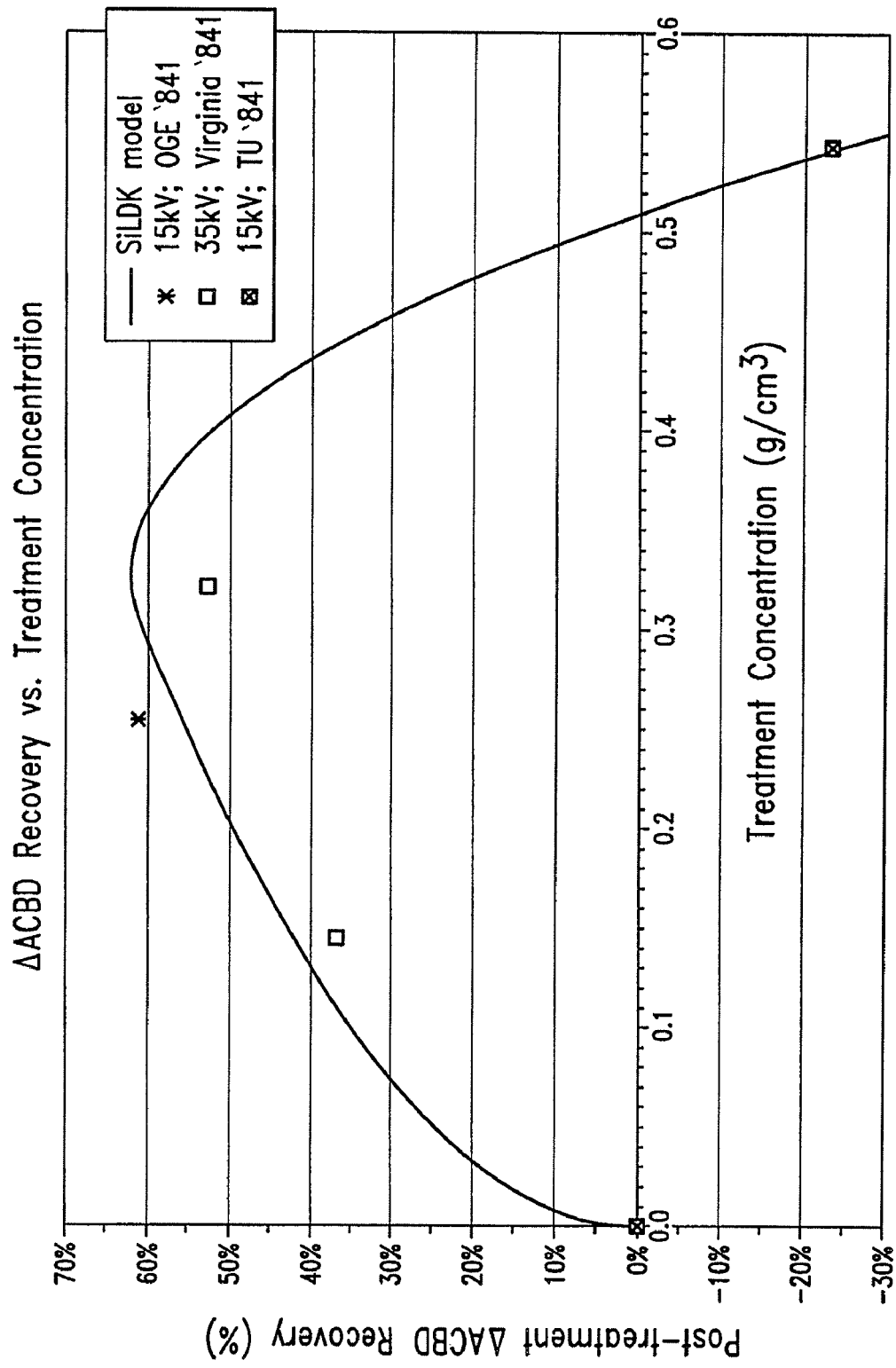
FIG. 12 is a plot of the compilation of all available results of the published data according to FIGS. 8-11 showing the relationship between fluid concentration and post-treatment ACBD improvement.

Using data published in the literature it is possible to make predictions of post-treatment reliability based upon the concentration of treatment fluids in the insulation. FIGS. 8, 9, 10 and 11 are published results which disclose both the actual AC breakdown performance and the concentration profiles of the treatment fluid in the insulation. These figures represent different cables which were treated in the field with Cable-CURE®/XL fluid, the latter being a catalyzed mixture comprising phenylmethyldimethoxysilane and trimethylmethoxysilane in an approximately 70/30 weight ratio and marketed by Utilx Corp. As described previously, the concentration profiles in FIGS. 8 to 11 are numerically integrated to obtain the total fluid within the insulation. FIG. 12 is a compilation and transformation of these numerical integrations wherein the solid curve represents a regression fit of the points. Furthermore, for the data presented in FIG. 12, pre-treatment AC breakdown results, post-treatment AC breakdown results, and the concentrations of treatment fluids are published or easily estimated. By definition, the origin in FIG. 12 (i.e., 0,0 point) is known for each of these cases. That is, the increase in AC breakdown performance is zero at time zero. The post treatment ACBD data is transformed into the "percent recovered" metric of FIG. 12 as follows:

$$\% \quad \Delta ACBD_{recovery} = (ACBD_{post\;treatment} - ACBD_{pre-treatment}) \div (ACBD_{new} - ACBD_{pre-treatment})$$

where $ACBD_{new}$ is arbitrarily defined as 40 kV/mm for polyethylene (PE) and 31.5 kV/mm for EPR-insulated cables, these values being typical for the respective polymers. Other values may be used for other insulation systems. In addition to the data of FIG. 12, a polynomial model is available to show the general relationship, at least for the preferred embodiment of the fluid mixture discussed in U.S. Pat. No. 5,372,841. It is believed that performance of other fluids would likely follow different lines than that shown in FIG. 12. The above polynomial model of FIG. 12 is represented by the equation:

$$\% \Delta ACBD = a \Sigma X_i^b - c(\Sigma x_i - d)^2$$

where a, b, c, and d are constants determined by statistical means, $\Sigma X_i$ is the sum of the individual concentrations of the alkoxysilane and siloxane oligomers of the CableCURE/XL fluid, and where the second term is 0 (below the threshold value of "d" for all negative ($\Sigma X_i - d$) (i.e., the data is fit empirically to this mode and the second term has a floor value of zero. The curve in FIG. 12 is defined by the foregoing equation and values for a, b, c, and d of 3.5, 0.5, 1800, and 0.3, respectively, obtained from a computer fit of the data. The first term ($a\Sigma x_i^b$) defines a generally parabolic relationship with diminishing returns of AC breakdown recovery for increasing concentration of treatment fluids. The competing second parabolic term ($-c(\Sigma x_i - d)2$) represents mechanical strains from swell which subtract from cable reliability. This over saturation (or swelling), and the resulting strains, is induced in the cable by ever increasing concentrations of treatment fluid. "Over saturation" is defined herein as the introduction and dissolution of a relatively soluble component (e.g., one having a solubility in the insulation of greater than about 3 weight % at cable operating temperatures) which can lead to excessive swelling of the insulation and result in degradation of the mechanical properties thereof. Until some threshold concentration (d) is met, the second term is ignored, but once $\Sigma X_i$ exceeds (d), the function is evaluated and further increases in concentration decrease the reliability of the cable (i.e., a transition to over saturation occurs). A further effect of over saturation can be seen in FIG. 12, wherein a concentration of fluid greater than about 0.03 g/cm 3 is associated with reduced ACBD performance. Additionally, over saturation with any individual component can result in interference with the diffusion/equilibrium concentration of the other components in the insulation. This is in contrast with supersaturation, which is the condensation of previously dissolved fluid from the insulation due to thermal cycling, as described in U.S. Pat. No. 6,162,491, which teaches that the equilibrium concentration of the total amount of soluble components should be reduced by dilution to avoid supersaturation. FIG. 11 is a re-plotting of the data of FIG. 2 in U.S. Pat. No. 6,162,491. Swelling approaching 9% provides, and the attendant decrease in reliability demonstrates, that there is a point where too much fluid can be supplied to inflict damage from over saturation. However, it is now believed that a better approach to avoid supersaturation is the use of components having flat equilibrium concentration-temperature profiles. The instant simulation method, together with post-injection performance models compiled using experimental data, can thus be used to estimate post-injection reliability.

Figure 14:
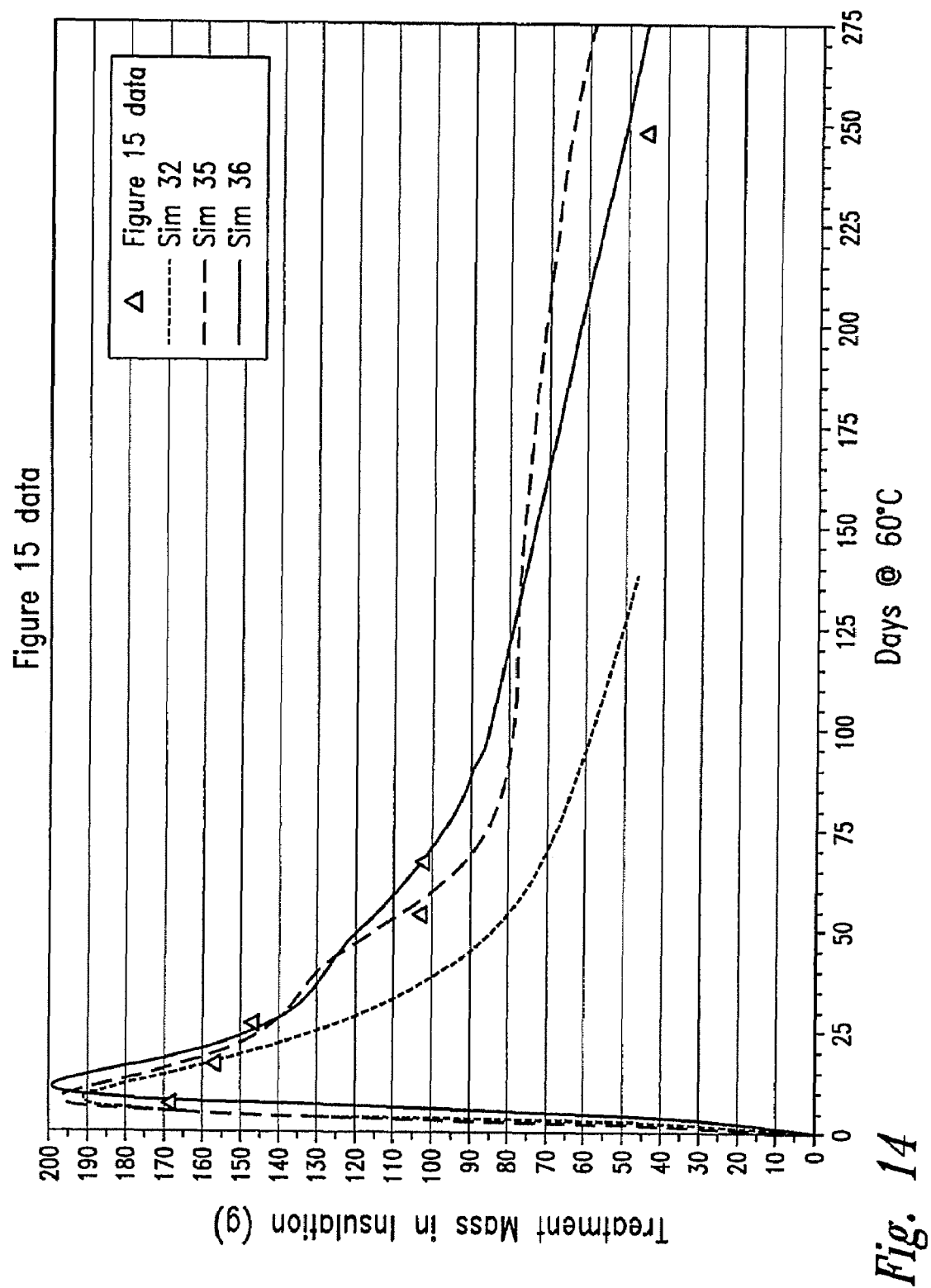
FIG. 14 is a plot of the total fluid mass in the insulation as a function of time (as reported by Kleyer & Chatterton).

With an approximation of the existing performance and the desired reliability specification, a correlation such as that depicted by FIG. 12 is applied to determine the minimum concentration of treatment fluid required to meet the reliability requirement. For example, referring to FIG. 12, assume a cable has an estimated 40 kV/mm original AC breakdown, with an estimated 10 kV/mm remaining AC breakdown (see above mentioned estimation methods), and it is desired to have an 18 kV/mm post-treatment AC breakdown. Then, from FIG. 12, the fluid concentration in the insulation must be maintained above 0.0056 g/cm3 (i.e., the point where the simulation line, labeled "SiLDK model" in FIG. 12, crosses 27% "Post-treatment ΔAC BD Recovery" on the way up, where the 27% ΔAC BD is the change in AC BD=100 (18−10)/(40−10), but not greater than 0.0475 g/cm3 (i.e., the point where the "SiLDK model" line crosses 27% on the "Post-treatment ΔAC BD Recovery" on the way down) to avoid over saturation, as defined herein. Again, it should be recognized that the regression line of FIG. 14 must go through the origin (0, 0) since the concentration of treatment fluid is necessarily zero when fluid is first fed into the cable. The fluid concentration increases over time to some maximum and then begins a general decline, which may be punctuated with local maxima. Further restricting the shape of the time-dependent concentration curve of FIG. 14 is the requirement that the curve must start at zero and end at zero and can never be negative. How quickly the fluid concentration crosses the minimum performance expectation on the way up is also important and it is also predicted by the instant simulation method. When a high pressure method, such as that described in above cited Publication No. US 2005/0189130 or Publication No. US 2005/0192708 is used to inject and confine the dielectric enhancement fluid in a cable, this time can be a matter of several days. However, with the prior art (low pressure) approaches, months or even years can pass before the maximum performance is achieved and the instant simulation method allows prediction of dielectric performance for a wide variety of circumstances as a function of time. A plot similar to that of FIG. 12 can be obtained for any other restorative fluid composition, such as the above described mixture of menthylanthranilate and ferrocene or the compositions of Table 1, and the above description will serve to illustrate its application in the practice of the instant simulation method.

Again, for the above discussed menthylanthranilate/ferrocene mixture, integration of each component curve within the insulation area of FIG. 6 with respect to radius, in the manner discussed above, yields a total predicted treatment concentration of 0.0143 g/cm$^3$ after 5¼ years. If, for example, the menthylanthranilate/ferrocene system had a similar performance profile to the SiLDK model of FIG. 12, the treatment would provide more than the above required minimum treatment fluid concentration of 0.0056 g/cm$^3$. The simulation is continued until the total fluid concentration is predicted to reach a value equal to the customer specified minimum (e.g., 0.0056 g/cm$^3$ in the above example). It is at that point that the time and exudation indicated in FIG. 7 is established and at which an isothermal simulation curve crosses simulated data to establish the flux-weighted temperature (e.g., 80% exudate after 10 years in FIG. 7 in the above example).

Optimization of performance can be made at one flux-weighted temperature which matches several of the field profiles plotted in FIG. 1. Each of the formulations listed in Table 1 represents just such an optimization. Furthermore, once the flux-weighted temperature is determined according to the above described simulation, preferred components can be identified and included in the dielectric enhancement fluid composition used to treat the subject cable, employing either a conventional low-pressure method or a high-pressure one, as disclosed in Publication No. US 2005/0189130, cited supra. Again, each fluid described in Table 1 includes some of these preferred components.

Since increasing the amount of fluid injected increases the amount of time each component thereof is present above any threshold concentration and needed to provide the desired ACBD value, the amount of total fluid preferably injected is as large as possible. This preferably entails using the above mentioned high-pressure method, but can be used with the lower pressure methods as well, in either case with the following preferred constraints:

1. The pressure of injection and containment should be below the yield point of the cable,
2. Total fluid within the insulation at any time during the post-treatment period is maintained below the point where over saturation hampers reliability performance,
3. Treated life expectancy of the cable meets or exceeds customer requirements, and
4. The incremental cost of additional fluid (and/or its delivery) is greater than the value perceived by the customer.

Example of the Instant Simulation Method in a Marketing Mode

The following example illustrates that the prior art method using phenylmethyldimethoxysilane or CableCURE® with a low pressure injection using a soak period is predicted by the simulation to have inferior longevity versus one of the formulations of Table 1.

Consider the cable described by Kleyer and Chatterton in their paper, "The Importance of Diffusion and Water Scavenging in Dielectric Enhancement of Aged Medium Voltage Cables" (IEEE/PES conference; Apr. 10-15, 1994). The cable and the experiment were described as follows:

"... a 1/0 AWG, 15 kV rated cable ... cut into segments, filled with phenylmethyldimethoxysilane and the ends sealed before immediate immersion in a 60° C. constant temperature water bath. At various time intervals (7, 17, 27, 54, 67 and 248 days) a segment was removed from the bath, sectioned and the insulation was profiled by microscopic infrared spectroscopy for treatment distribution."

Figure 4:
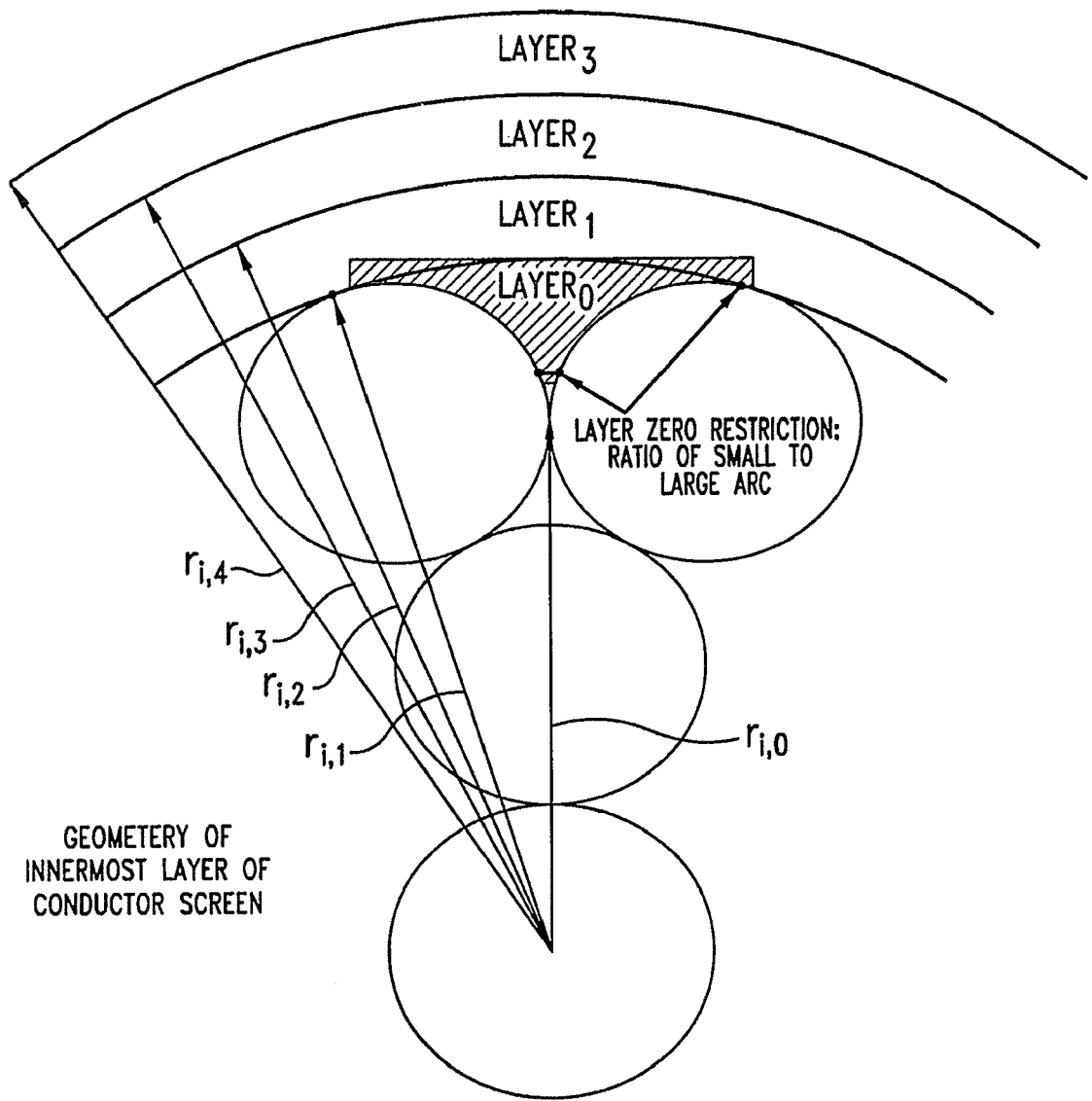
FIG. 4 is an illustration of the geometry of the innermost cable layer of a stranded conductor.

The results of that experiment, which are plotted in FIG. 4 in the Kleyer & Chatterton paper, were refined and re-plotted in "Dielectric Enhancement Technology" by Bertini & Chatterton in March/April 1994 IEEE Electrical Insulation Magazine. The latter data were digitized and are re-plotted herein in FIG. 13. It should, however, be noted that the original paper by Kleyer and Chatterton did not provide a complete description as the insulation thickness was omitted and the above mentioned refinement required some assumptions/approximations. Nevertheless, this should serve to illustrate the principles of the instant simulation method and a similar plot for any given fluid could be generated and used to fit the parameters, as described below.

Figure 13:
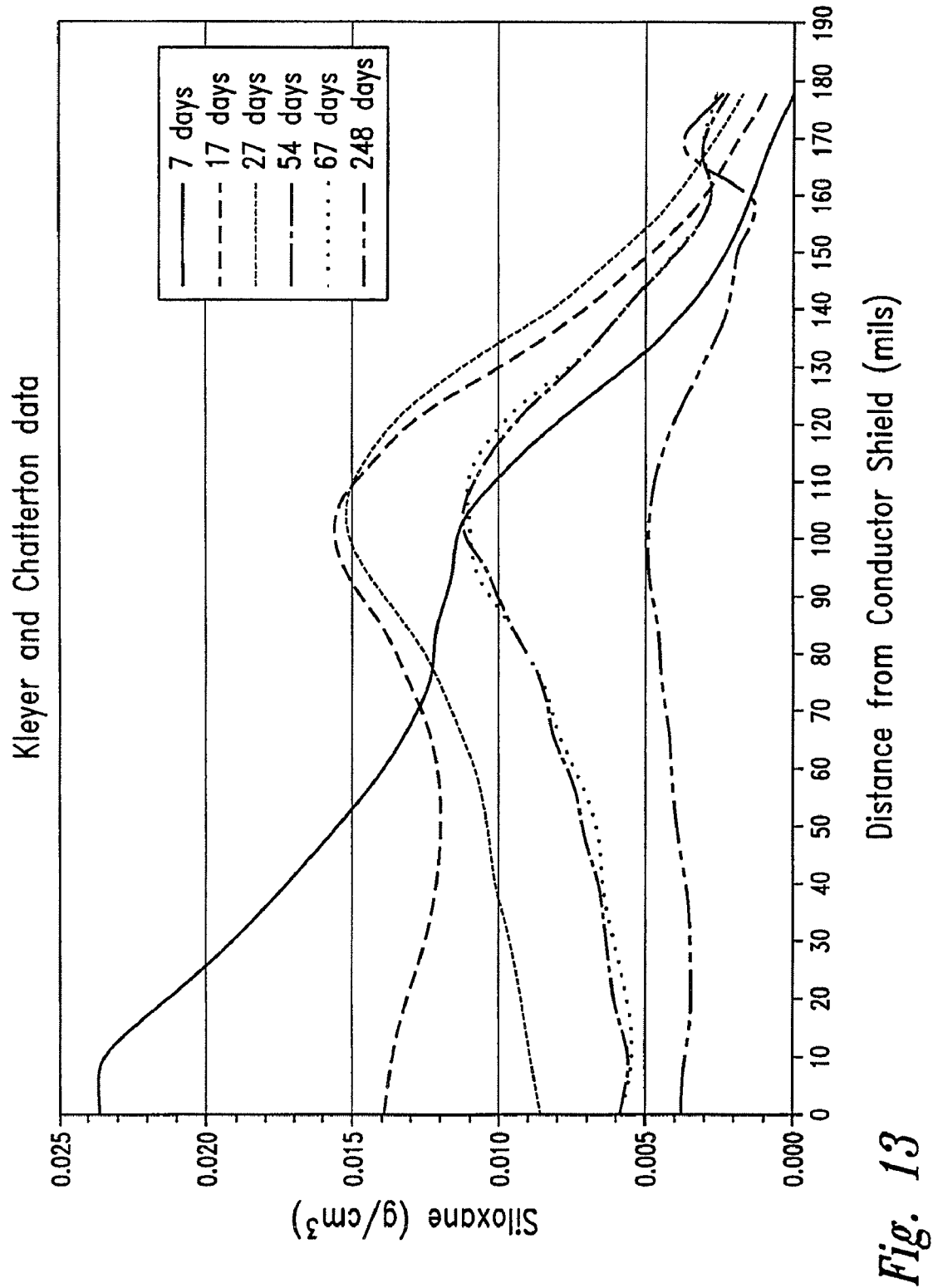
FIG. 13 is a plot of siloxane concentration as a function of radial position in a cable (digitized data from Kleyer & Chatterton).

The total amount of fluid in the insulation of the cable for each curve in FIG. 13 ($M_{insulation}$) can be obtained by numerically integrating the concentration profile across the cylindrical geometry of the cable:

$$M_{insulation} = \Sigma X_{siloxane,l} \cdot v_l \text{ (for all layers, } l, \text{ provided in FIG. 13)}$$

where $X_{siloxane,l}$ is the mass concentration of the silane monomer and its siloxane oligomer components (in this case, phenylmethyldimethoxysilane and oligomers thereof and having the units g/cm$^3$) in each layer, l. In the above equation, $v_l$ is the volume of each cylinder, defined by an arbitrary length and inner and outer radii. The mass concentration is the measured value halfway between the inner and outer radii. The results of this calculation are shown as triangles in FIG. 14 and reveal the total concentration of silane and siloxane in the insulation for the following times: 7, 17, 27, 54, 67 and 248 days. Plotted along with the above data in FIG. 14, are simulations (i.e., the curves) according to the instant method, wherein the above mentioned parameters were adjusted until an acceptable regression fit was achieved (Sim 36 in FIG. 14). Notwithstanding the necessary approximation of the above data refinement, and deciphering the cable geometry as best as possible, it is possible to virtually recreate the 12 year-old experiment using the instant simulation and derive information about reaction rates and permeation properties of the phenylmethyldimethoxysilane fluid. Thus, the parameters that are adjusted to fit the data of FIG. 14 are:

1) Reaction rate,
2) ($\alpha$) for the phenylmethyldimethoxysilane and its oligomers and ($\alpha$) for water,
3) amount of initial fluid as a percentage of the interstitial volume,
4) layer zero restriction ratio, and
5) extent and location of the halo as a histogram, wherein the halo is the percent of the insulation volume that is void (i.e. no insulation). The histogram may often be conveniently represented as a normal distribution by identifying the radial location of the peak, the value of the peak and the standard deviation of the distribution along the radius.

A computer program could employ well-known techniques, such as an adaptive randomly directed search, to adjust all of the above parameters simultaneously to get the best fit to a plot like FIG. 14. Alternatively, these parameters could be adjusted one at a time, or a few at a time. Utilizing standard regression procedures one can determine the best fit solution for the parameters. As an example, the actual parameter values obtained in Simulation 36 (Sim 36) in FIG. 14 are:

(1) Reaction rates:

The following table summarizes the various parameters for rate constants, k, for phenylmethyldimethoxysilane and its products of hydrolysis/condensation.

|  | without catalyst | | with titanium(IV) isopropoxide catalyst | |
| --- | --- | --- | --- | --- |
| Reaction | Frequency Factor $k_0$ $(mol/cm^3)^{1-n}/sec$ | Activation energy E cal | Frequency Factor $k_0$ $(mol/cm^3)^{1-n}/sec$ | Activation energy E cal |
| PhMe-1.0 + $H_2O$ → PhMe-1.1 + MeOH | 5.67E+14 | 23,000 | 5.67E+14 | 10,000 |
| PhMe-1.1 + $H_2O$ → PhMe-1.2 + MeOH | 2.83E+14 | 23,000 | 2.83E+14 | 10,000 |
| 2 PhMe-1.1 → PhMe-2.0 + H2O | 1.42E+14 | 23,000 | 1.42E+14 | 10,000 |
| 2 PhMe-1.1 → PhMe-2.1 + MeOH | 1.42E+13 | 23,000 | 1.42E+13 | 10,000 |
| 2 PhMe-1.2 → PhMe-2.2 + $H_2O$ | 2.83E+14 | 23,000 | 2.83E+14 | 10,000 |
| PhMe-1.1 + PhMe-1.0 → PhMe-2.0 + MeOH | 7.08E+12 | 23,000 | 7.08E+12 | 10,000 |
| PhMe-1.1 + PhMe-1.2 → PhMe-2.1 + $H_2O$ | 1.89E+14 | 23,000 | 1.89E+14 | 10,000 |
| PhMe-2.0 + $H_2O$ → PhMe-2.1 + MeOH | 1.42E+14 | 23,000 | 1.42E+14 | 10,000 |
| PhMe-2.1 + $H_2O$ → PhMe-2.2 + MeOH | 7.08E+13 | 23,000 | 7.08E+13 | 10,000 |
| PhMe-1.2 + PhMe-2.2 → PhMe-3.2 + $H_2O$ | 5.67E+13 | 23,000 | 5.67E+13 | 10,000 |
| PhMe-1.2 + PhMe-3.2 → PhMe-4.2 + $H_2O$ | 1.13E+13 | 23,000 | 1.13E+13 | 10,000 |
| 2 PhMe-2.2 → PhMe-4.2 + $H_2O$ | 2.27E+12 | 23,000 | 2.27E+12 | 10,000 | wherein Ph represents a phenyl group, Me represents a methyl group and PhMe—X.Y indicates a silane having a DP of X and where Y indicates the number of hydroxyl groups formed by the corresponding hydrolysis. Thus, for example, PhMe—1.0 is monomeric phenylmethyldimethoxysilane, PhMe—1.2 is (Ph)(Me)Si(OH)2, PhMe—2.0 is the dimer (Ph)(Me)(MeO)SiOSi(OMe)(Me)(Ph), and so on.

(2) (α) for phenylmethyldimethoxysilane and its oligomers (PM) and (α) for water (H2O):

$\alpha_{H2O}=0.30$ $\alpha_{PM}=0.75$ (3) Amount of initial fluid as a percentage of the interstitial volume is 108%
(4) Layer zero restriction ratio is 3.5%, and
(5) Extent of the halo:
  Peak of halo is 2% void in insulation;
  Standard deviation of the halo void distribution is 71 mils;
  Peak is located at a radius of 830 mils In order to further clarify the curve-fitting of the parameters to the actual data, the following discussion is believed helpful. Again, with reference to FIG. 14, after the total concentration of phenylmethyldimethoxysilane and its oligomers peaks at about 10 days, the rate of decay of the concentration of the phenylmethyldimethoxysilane and its oligomers is most dependent on the reaction rates of conversion of monomer to the various oligomers. These reaction rates, in turn, are most dependent on the reaction kinetics and the concentration of water and catalyst available across the radius of the cable. If the modeled reactions proceed more rapidly than exhibited by the actual data, then the reaction rate constant, or the concentration of the water available for reaction, in the simulation is reduced.

The water concentration is dependent upon the amount of water present in the insulation, including the halo which is always present in aged cable, and the amount of water in the conductor shield before treatment. Even more importantly, this concentration depends upon $\alpha_{water}$, as defined in the description of Section 400, above, which largely determines the rate at which water ingresses from the outside into the cable throughout the simulation. If there were no deviation from ideal solution behavior, then water would be virtually excluded from cable since it has a much lower equilibrium concentration than the alkoxysilane (i.e., if $\alpha_{water}=1$, then there would be very little penetration by water; if $\alpha_{water}=0$, then the presence of other components would not affect water permeation). Two other independent data points provide constraints on the water availability and the reaction rates. The first constraining data point is the indication that an anhydrous, or largely water-free, environment persists for some time in the interstices of cables treated with the prior art materials (i.e., phenylmethyldimethoxysilane in this case). See, for example, "Failures in Silicone-treated German Cables Due to an unusual Aluminum-Methanol Reaction", Bertini, Presented to the Transnational Luncheon of the ICC, Oct. 29, 2002. If $\alpha_{water}$ is too low, or the reaction rate is too slow, water will permeate into the strands and an anhydrous environment will never be achieved. The second constraint was supplied by the previously cited Kleyer and Chatterton paper, when they wrote:

"The presence of the water reactive functionality of phenylmethyldimethoxysilane within the insulation was confirmed by microscopic infrared spectroscopy (Si-OMe band at 1190 $cm^{-1}$) through 54 days."

In other words, methoxy groups were still observable by micro-IR at 54 days, but were no longer observed at 67 days. The reaction rate of the simulation is constrained by the practical observation that all IR-measurable quantities of methoxy functionality must disappear in the 13 days between 54 and 67 days.

These two constraints, along with FIG. 9 data, are used to establish $\alpha_{water}$ and the chemical kinetics, which, in turn, largely determine the slope of the curve in FIG. 14 between the peak (at about 10 days) and the point at 54 days. The reaction rates and the $\alpha_{water}$ were established by a regression fit of the refined Kleyer data. The point at which the curve in FIG. 14 flattens somewhat is determined primarily by the amount of the originally supplied fluid which exudes un-reacted or under-reacted (i.e., no condensation to form oligomers). In this illustration, exuded, un-reacted or under-reacted fluid encompasses monomeric species and hydrolysis derivatives of phenylmethyldimethoxysilane, specifically including those monomers with only methoxy ligands, only hydroxyl ligands, and those with one each methoxy and hydroxyl, which exude from the insulation. Vincent demonstrated (see Table 2 of U.S. Pat. No. 4,766,011) that, without catalyst, there was no observable condensation of monomer in the presence of water for the phenylmethyldimethoxysilane monomer employed by Kleyer and Chatterton. Hence, the reaction rate without catalyst is inconsequentially small.

The 194-day plateau and slow decay region, from day 54 to day 248, is determined by the rate of exudation of the condensing oligomer. During this period, there is a steady flux of several oligomeric species out of the insulation, and for a while, a corresponding approximately equal flux into the insulation of the fluid remaining in the conductor interstices and the conductor shield. Once the latter supply is nearly depleted, the flux into the insulation begins to decrease and the total concentration therein begins to decrease along with it. Those skilled in the art will recognize that, as the total concentration begins to decrease, the exudation out of the insulation also slows. This final period is well described as an exponential decay to zero.

Fitting of the last 248 day point depends almost entirely on the permeation rate of the dynamic mix of oligomers. As described previously, Chatterton and Bertini provide permeation equations for monomer, dimer and tetramer. The dimer and tetramer were terminated with methyl groups to determine experimental diffusion rates. This does not exactly correspond to the real-world case where these oligomers are generally terminated with hydroxyl groups or potentially cyclized. Even with these differences, reasonable interpolations and extrapolations to other members of the homologous series of oligomers (e.g. linear trimer and pentamer) can be readily made by those skilled in the art. The distribution of homologous oligomers can thus be determined by the transition time from the plateau period to the exponential decay period of FIG. 14. For example, if a simulation predicted that the concentration decreased such that the resulting curve fell to the left of, and below, the measured value (e.g. Sim 32 in FIG. 14), then the dynamic average degree of polymerization (DP) would have to be increased. On the other hand, if the simulated line fell above, and to the right of, the measured value (e.g. Sim 35), the dynamic DP would have to be decreased. These dynamic DP values would in turn be increased or decreased by increasing or decreasing the respective reaction rates of condensation to higher oligomers. The aforementioned Kleyer and Chatterton paper provides guidance on the subject when they report:

"The data confirmed that oligomerization occurs within the strands, providing a polymeric distribution through a degree of polymerization (DP) of eight or more."

Those familiar with methoxysilane hydroysis will appreciate that a statistical distribution of DPs is formed, driven by chemical reaction considerations. Yet another constraining consideration is the average concentration in the insulation during the period from 54 to 248 days. As the DP increases, the equilibrium concentration due to lowered solubility decreases and hence a simulation falling below the 54 day and 67 day data points implies that the average DP is too great while a simulation curving above those two points would imply an average DP that is too low.

All other variables not adjusted as empirical constants in the previous paragraphs which are required to complete the simulation were measured by experimental means and/or were obtained from published results.

That which is claimed is:

1. A computer simulation method for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time t=0, the simulation method comprising: for a selected length of the simulated cable, defining a plurality of radially arranged finite volumes extending the selected length of the simulated cable; for each of a plurality of different selected incremental time periods occurring after t=0: estimating the radial temperature of each finite volume; calculating the change in mass of the dielectric enhancement fluid component within each finite volume due to chemical reactions using the estimated radial temperature; calculating the diffusion properties of the dielectric enhancement fluid component within each finite volume using the estimated radial temperature; calculating the mass flux from one finite volume to another finite volume for the dielectric enhancement fluid component within the finite volumes; and combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume; and outputting the value of the new concentration for the dielectric enhancement fluid component within each finite volume.

2. The computer simulation method of claim 1, further including using the outputted value of the new concentration for the dielectric enhancement fluid component within each finite volume to determine a calculated concentration profile for the dielectric enhancement fluid component within the conductor shield and the insulation jacket of the simulated cable for at least one time after t=0, and using the calculated concentration profile to select a suitable fluid composition for injection into the electrical cable being simulated.

3. The computer simulation method of claim 2, further including providing an empirical model of the dielectric performance of the simulated cable as a function of concentration of the dielectric enhancement fluid component, and using the empirical model and the calculated concentration profile for the dielectric enhancement fluid component within the conductor shield and the insulation jacket of the simulated cable to determine an estimate of dielectric performance changes for at least one time after t=0.

4. The computer simulation method of claim 1 wherein the finite volumes are a plurality of coaxial cylinders extending the selected length of the simulated cable.

5. The computer simulation method of claim 1, further including:
   using the outputted value of the new concentration for the dielectric enhancement fluid component within each finite volume to determine a first calculated concentration profile for the dielectric enhancement fluid component within the conductor shield and the insulation jacket of the simulated cable for a selected time after t=0;

for each of a plurality of different selected incremental time periods occurring after t=0 using a selected constant radial temperature for each finite volume:

calculating the change in mass of the dielectric enhancement fluid component within each finite volume due to chemical reactions;

calculating the diffusion properties of the dielectric enhancement fluid component within each finite volume;

calculating the mass flux from one finite volume to another finite volume for the dielectric enhancement fluid component within the finite volumes; and combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume;

outputting the value of the new concentration for the dielectric enhancement fluid component within each finite volume using the selected constant radial temperature;

using the outputted value of the new concentration for the dielectric enhancement fluid component within each finite volume using the selected constant radial temperature to determine a second calculated concentration profile for the dielectric enhancement fluid component within the conductor shield and the insulation jacket of the simulated cable for the selected time after t=0;

determining if the second calculated concentration profile approximates the first calculated concentration profile; and using the selected constant radial temperature as a flux-weighted temperature if the second calculated concentration profile approximates the first calculated concentration profile.

6. The computer simulation method of claim 5, wherein if the second calculated concentration profile does not approximate the first calculated concentration profile, selecting a different constant radial temperature for each finite volume to use for each of the plurality of different selected incremental time periods occurring after t=0, until the second calculated concentration profile approximates the first calculated concentration profile.

7. The computer simulation method of claim 5 wherein the flux-weighted temperature is used to select a suitable fluid composition for injection into the electrical cable being simulated.

8. The computer simulation method of claim 1, further including:

using the outputted value of the new concentration for the dielectric enhancement fluid component within each finite volume to determine a first calculated concentration profile for the dielectric enhancement fluid component within the conductor shield and the insulation jacket of the simulated cable for a selected time after t=0;

determining a constant radial temperature for each finite volume that results in a second calculated concentration profile for the dielectric enhancement fluid component within the conductor shield and the insulation jacket of the simulated cable for the selected time after t=0 that approximates the first calculated concentration profile, by:

selecting a constant radial temperature for each finite volume to use in determining the second calculated concentration profile;

using the selected constant radial temperature, for each of a plurality of different selected incremental time periods occurring after t=0:

calculating the change in mass of the dielectric enhancement fluid component within each finite volume due to chemical reactions;

calculating the diffusion properties of the dielectric enhancement fluid component within each finite volume;

calculating the mass flux from one finite volume to another finite volume for the dielectric enhancement fluid component within the finite volumes;

combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume;

outputting the value of the new concentration for the dielectric enhancement fluid component within each finite volume using the selected constant radial temperature;

using the outputted value of the new concentration for the dielectric enhancement fluid component within each finite volume using the selected constant radial temperature to determine the second calculated concentration profile;

determining if the second calculated concentration profile approximates the first calculated concentration profile;

if the selected constant radial temperature does not result in the second calculated concentration profile being determined to approximate the first calculated concentration profile, selecting a new constant radial temperature to use in determining the second calculated concentration profile; and if the selected constant radial temperature does result in the second calculated concentration profile being determined to approximate the first calculated concentration profile, using the selected constant radial temperature as a flux-weighted temperature.

9. A computer simulation method for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time, the simulation method comprising: for a selected length of the simulated cable, defining a plurality of radially arranged finite volumes extending the selected length of the simulated cable; estimating the radial temperature of each finite volume; for a selected time period after the initial time, performing at least once each of: calculating the change in mass of the dielectric enhancement fluid component within each finite volume due to chemical reactions using the estimated radial temperature; calculating the diffusion properties of the dielectric enhancement fluid component within each finite volume using the estimated radial temperature; calculating the mass flux from one finite volume to another finite volume for the dielectric enhancement fluid component within the finite volumes; and combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume; and outputting the value of the new concentration for the dielectric enhancement fluid component within each finite volume.

10. The computer simulation method of claim 9, further including:
  using the outputted value of the new concentration for the dielectric enhancement fluid component within each finite volume to determine a first calculated concentration profile for the dielectric enhancement fluid component within the conductor shield and the insulation jacket of the simulated cable for the selected time period after the initial time;
  determining a constant radial temperature for each finite volume that results in a second calculated concentration profile for the dielectric enhancement fluid component within the conductor shield and the insulation jacket of the simulated cable for the selected time period after the initial time that approximates the first calculated concentration profile, by:
    selecting a constant radial temperature for each finite volume to use in determining the second calculated concentration profile;
    using the selected constant radial temperature, for a selected time period after the initial time, performing at least once each of:
      calculating the change in mass of the dielectric enhancement fluid component within each finite volume due to chemical reactions;
      calculating the diffusion properties of the dielectric enhancement fluid component within each finite volume;
      calculating the mass flux from one finite volume to another finite volume for the dielectric enhancement fluid component within the finite volumes;
      combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume;
    outputting the value of the new concentration for the dielectric enhancement fluid component within each finite volume using the selected constant radial temperature;
    using the outputted value of the new concentration for the dielectric enhancement fluid component within each finite volume using the selected constant radial temperature to determine the second calculated concentration profile;
    determining if the second calculated concentration profile approximates the first calculated concentration profile;
    if the selected constant radial temperature does not result in the second calculated concentration profile being determined to approximate the first calculated concentration profile, selecting a new constant radial temperature to use in determining the second calculated concentration profile; and
    if the selected constant radial temperature does result in the second calculated concentration profile being determined to approximate the first calculated concentration profile, using the selected constant radial temperature as a flux-weighted temperature.

11. The computer simulation method of claim 10 wherein the flux-weighted temperature is used to select a suitable fluid composition for injection into the electrical cable being simulated.

12. A computer simulation method for simulating an electrical cable having a stranded conductor surrounded by a conductor shield encased in an insulation jacket and having an interstitial void volume in the region of the conductor injected with a fluid composition comprising at least one dielectric enhancement fluid component so as to at least partially fill the interstitial void volume at an initial time, the simulation method comprising:
  for a selected length of the simulated cable, defining a plurality of radially arranged finite volumes extending the selected length of the simulated cable;
  estimating the radial temperature of each finite volume;
  for a selected time period after the initial time, performing at least once each of:
    calculating the change in mass of the dielectric enhancement fluid component within each finite volume due to chemical reactions;
    calculating the diffusion properties of the dielectric enhancement fluid component within each finite volume;
    calculating the mass flux from one finite volume to another finite volume for the dielectric enhancement fluid component within the finite volumes; and
    combining the calculated change in mass of the dielectric enhancement fluid component within each finite volume due to chemical reactions with the calculated mass flux between each adjacent finite volume for the dielectric enhancement fluid component within the finite volumes to determine a new concentration for the dielectric enhancement fluid component within each finite volume;
  using the new concentration for the dielectric enhancement fluid component within each finite volume to determine a calculated concentration profile for the dielectric enhancement fluid component within the conductor shield and the insulation jacket of the simulated cable for the selected time period after the initial time; and
  using the calculated concentration profile to select a suitable fluid composition for injection into the electrical cable being simulated.

13. The computer simulation method of claim 12, further including providing an empirical model of the dielectric performance of the simulated cable as a function of concentration of the dielectric enhancement fluid component, and using the empirical model and the calculated concentration profile for the dielectric enhancement fluid component within the conductor shield and the insulation jacket of the simulated cable to determine an estimate of dielectric performance changes for times after the initial time.

14. A computer simulation method for simulating an electrical cable having a stranded conductor surrounded by a conductor shield encased in an insulation jacket and having an interstitial void volume in the region of the conductor injected with a fluid composition comprising a plurality of dielectric enhancement fluid components so as to at least partially fill the interstitial void volume at an initial time t=0, the simulation method comprising:
  for a selected length of the simulated cable, defining a plurality of radially arranged finite volumes extending the selected length of the simulated cable;

estimating the radial temperature of each finite volume;
for each of a plurality of different selected incremental time periods occurring after t=0:
  calculating the changes in mass of the dielectric enhancement fluid components within each finite volume due to chemical reactions;
  calculating the diffusion properties of the dielectric enhancement fluid components within each finite volume;
  calculating the mass flux from one finite volume to another finite volume for the dielectric enhancement fluid components within the finite volumes; and
  combining the calculated change in mass of the dielectric enhancement fluid components within each finite volume due to chemical reactions with the calculated mass flux between each adjacent finite volume for the dielectric enhancement fluid components within the finite volumes to determine new concentrations for the dielectric enhancement fluid components within each finite volume; and
outputting the values of the new concentrations for the dielectric enhancement fluid components within each finite volume.

15. The computer simulation method of claim 14, further including:
using the outputted values of the new concentrations for the dielectric enhancement fluid components within each finite volume to determine a first combined calculated concentration profile for the dielectric enhancement fluid components within the conductor shield and the insulation jacket of the simulated cable for a selected time after t=0;
determining a constant radial temperature for each finite volume that results in a second combined calculated concentration profile for the dielectric enhancement fluid components within the conductor shield and the insulation jacket of the simulated cable for the selected time after t=0 that approximates the first calculated concentration profile, by:
  selecting a constant radial temperature for each finite volume to use in determining the second combined calculated concentration profile;
  using the selected constant radial temperature, for each of a plurality of different selected incremental time periods occurring after t=0:
    calculating the change in mass of the dielectric enhancement fluid component within each finite volume due to chemical reactions;
    calculating the diffusion properties of the dielectric enhancement fluid component within each finite volume;
    calculating the mass flux from one finite volume to another finite volume for the dielectric enhancement fluid component within the finite volumes;
    combining the calculated change in mass of the dielectric enhancement fluid component within each finite volume due to chemical reactions with the calculated mass flux between each adjacent finite volume for the dielectric enhancement fluid components within the finite volumes to determine a new concentration for the dielectric enhancement fluid component within each finite volume;
  outputting the values of the new concentrations for the dielectric enhancement fluid components within each finite volume using the selected constant radial temperature;
  using the outputted values of the new concentrations for the dielectric enhancement fluid components within each finite volume using the selected constant radial temperature to determine the second combined calculated concentration profile;
  determining if the second combined calculated concentration profile approximates the first combined calculated concentration profile;
  if the selected constant radial temperature does not result in the second combined calculated concentration profile being determined to approximate the first combined calculated concentration profile, selecting a new constant radial temperature to use in determining the second combined calculated concentration profile; and
  if the selected constant radial temperature does result in the second combined calculated concentration profile being determined to approximate the first combined calculated concentration profile, using the selected constant radial temperature as a flux-weighted temperature.

16. A computer simulation method for simulating an electrical cable having a stranded conductor surrounded by a conductor shield encased in an insulation jacket and having an interstitial void volume in the region of the conductor injected with a fluid composition comprising a plurality of dielectric enhancement fluid components so as to at least partially fill the interstitial void volume at an initial time t=0, the simulation method comprising:
for a selected length of the simulated cable, defining a plurality of radially arranged finite volumes extending the selected length of the simulated cable;
estimating the radial temperature of each finite volume;
for each of a plurality of different selected incremental time periods occurring after t=0:
  calculating the changes in mass of the dielectric enhancement fluid components within each finite volume due to chemical reactions;
  calculating the diffusion properties of the dielectric enhancement fluid components within each finite volume;
  calculating the mass flux from one finite volume to another finite volume for the dielectric enhancement fluid components within the finite volumes; and
  combining the calculated change in mass of the dielectric enhancement fluid components within each finite volume due to chemical reactions with the calculated mass flux between each adjacent finite volume for the dielectric enhancement fluid components within the finite volumes to determine new concentrations for the dielectric enhancement fluid components within each finite volume;
using the new concentrations for the dielectric enhancement fluid components within each finite volume to determine a calculated concentration profile for each of the dielectric enhancement fluid components within the conductor shield and the insulation jacket of the simulated cable for at least one time after t=0; and
using the calculated concentration profile for each of the dielectric enhancement fluid components to select a suitable fluid composition for injection into the electrical cable being simulated.

17. The computer simulation method of claim 16, further including providing an empirical model of the dielectric performance of the simulated cable as a function of concentrations of the dielectric enhancement fluid components, and using the empirical model and the calculated concentration profiles for the dielectric enhancement fluid components within the conductor shield and the insulation jacket of the simulated cable to determine an estimate of dielectric performance changes for times after the initial time.

18. A computer simulation method for simulating an electrical cable having a stranded conductor surrounded by a conductor shield encased in an insulation jacket and having an interstitial void volume in the region of the conductor injected with a fluid composition comprising a plurality of dielectric enhancement fluid components so as to at least partially fill the interstitial void volume at an initial time, the simulation method comprising:

for a selected length of the simulated cable, defining a plurality of radially arranged finite volumes extending the selected length of the simulated cable;

estimating the radial temperature of each finite volume;

for a selected time period after the initial time, performing at least once for each of the dielectric enhancement fluid components, each of:

calculating the changes in mass of the dielectric enhancement fluid components within each finite volume due to chemical reactions;

calculating the diffusion properties of the dielectric enhancement fluid components within each finite volume;

calculating the mass flux from one finite volume to another finite volume for the dielectric enhancement fluid components within the finite volumes; and combining the calculated change in mass of the dielectric enhancement fluid components within each finite volume due to chemical reactions with the calculated mass flux between each adjacent finite volume for the dielectric enhancement fluid components within the finite volumes to determine new concentrations for the dielectric enhancement fluid components within each finite volume; and outputting the values of the new concentrations for the dielectric enhancement fluid components within each finite volume.

19. The computer simulation method of claim 18, further including using the outputted values of the new concentrations for the dielectric enhancement fluid components within each finite volume to determine for each of the dielectric enhancement fluid components a calculated concentration profile within the conductor shield and the insulation jacket of the simulated cable for the selected time period after the initial time, and using the calculated concentration profiles to select a suitable fluid composition for injection into the electrical cable being simulated.

20. The computer simulation method of claim 19, further including providing an empirical model of the dielectric performance of the simulated cable as a function of concentrations of the dielectric enhancement fluid components, and using the empirical model and the calculated concentration profiles for the dielectric enhancement fluid components within the conductor shield and the insulation jacket of the simulated cable to determine an estimate of dielectric performance changes for times after the initial time.

21. The computer simulation method of claim 18, further including:

using the outputted values of the new concentrations for the dielectric enhancement fluid components within each finite volume to determine a first combined calculated concentration profile for the dielectric enhancement fluid components within the conductor shield and the insulation jacket of the simulated cable for the selected time period after the initial time;

determining a constant radial temperature for each finite volume that results in a second combined calculated concentration profile for the dielectric enhancement fluid components within the conductor shield and the insulation jacket of the simulated cable for the selected time period after the initial time that approximates the first combined calculated concentration profile, by:

selecting a constant radial temperature for each finite volume to use in determining the second combined calculated concentration profile;

using the selected constant radial temperature, for the selected time period after the initial time:

calculating the change in mass of the dielectric enhancement fluid component within each finite volume due to chemical reactions;

calculating the diffusion properties of the dielectric enhancement fluid component within each finite volume;

calculating the mass flux from one finite volume to another finite volume for the dielectric enhancement fluid component within the finite volumes;

combining the calculated change in mass of the dielectric enhancement fluid component within each finite volume due to chemical reactions with the calculated mass flux between each adjacent finite volume for the dielectric enhancement fluid components within the finite volumes to determine a new concentration for the dielectric enhancement fluid component within each finite volume;

outputting the values of the new concentrations for the dielectric enhancement fluid components within each finite volume using the selected constant radial temperature;

using the outputted values of the new concentrations for the dielectric enhancement fluid components within each finite volume using the selected constant radial temperature to determine the second combined calculated concentration profile;

determining if the second combined calculated concentration profile approximates the first combined calculated concentration profile;

if the selected constant radial temperature does not result in the second combined calculated concentration profile being determined to approximate the first combined calculated concentration profile, selecting a new constant radial temperature to use in determining the second combined calculated concentration profile; and if the selected constant radial temperature does result in the second combined calculated concentration profile being determined to approximate the first combined calculated concentration profile, using the selected constant radial temperature as a flux-weighted temperature.

* * * * *

UNITED STATES PATENT AND TRADEMARK OFFICE
CERTIFICATE OF CORRECTION

| | | |
|---|---|---|
| PATENT NO. | : 7,643,977 B2 | Page 1 of 1 |
| APPLICATION NO. | : 11/468118 | |
| DATED | : January 5, 2010 | |
| INVENTOR(S) | : Glen J. Bertini | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Sixteenth Day of November, 2010

David J. Kappos
*Director of the United States Patent and Trademark Office*